United States Patent
Matsuhisa et al.

[11] Patent Number: 5,910,456
[45] Date of Patent: Jun. 8, 1999

[54] PREPREGS AND CARBON FIBER-REINFORCED COMPOSITE MATERIALS

[75] Inventors: Yoji Matsuhisa, Matsuyama; Masanobu Kobayashi, Iyo-gun; Akira Okuda, Iyo; Kazuharu Shimizu, Otsu, all of Japan

[73] Assignee: Toray Industries, Inc., Japan

[21] Appl. No.: 08/702,726

[22] PCT Filed: Jan. 9, 1996

[86] PCT No.: PCT/JP96/00014

§ 371 Date: Sep. 9, 1996

§ 102(e) Date: Sep. 9, 1996

[87] PCT Pub. No.: WO96/21695

PCT Pub. Date: Jul. 18, 1996

[30] Foreign Application Priority Data

Jan. 9, 1995 [JP] Japan .................................... 7-018431
Jan. 10, 1995 [JP] Japan .................................... 7-018594

[51] Int. Cl.[6] .......................................................... B32B 5/02
[52] U.S. Cl. .......................... 442/179; 428/408; 428/902; 442/334; 442/394
[58] Field of Search ...................... 428/408, 902; 442/179, 334, 394

[56] References Cited

U.S. PATENT DOCUMENTS

| | | | |
|---|---|---|---|
| 5,168,004 | 12/1992 | Daumit et al. | 428/221 |
| 5,227,237 | 7/1993 | Saruyama et al. | 428/367 |
| 5,462,799 | 10/1995 | Kobayashi et al. | 428/364 |

*Primary Examiner*—James J. Bell
*Attorney, Agent, or Firm*—Austin R. Miller

[57] ABSTRACT

There is disclosed a prepreg including noncircular cross-section carbon fibers and a matrix resin having a flexural elastic modulus of 2.7 GPa or more and a water absorption of 3.4% or less under hot-wet conditions after curing; and another prepreg including carbon fibers and a matrix resin having an open-hole compression strength under hot-wet conditions and a compression strength after impact under room-temperature conditions of a quasi-isotropic material after curing of each 275 MPa or more. Carbon fiber-reinforced composite materials produced by curing these prepregs are excellent in open-hole compression strength under hot-wet conditions and in compression strength after impact, and can be suitably used especially as an aircraft primary structure material.

35 Claims, 2 Drawing Sheets

PREPREGS AND CARBON FIBER-REINFORCED COMPOSITE MATERIALS

TECHNICAL FIELD OF THE INVENTION

The present invention relates to prepregs and carbon fiber-reinforced composite materials, and particularly to prepregs and carbon fiber-reinforced composite materials excellent in compression strength under hot-wet conditions and suitable as a structural material, particularly as an aircraft primary structure material.

BACKGROUND ART OF THE INVENTION

Because a polymer-based composite material comprising carbon fibers and a matrix resin is light-weight and has excellent mechanical properties, it is broadly used for sporting goods uses, aerospace uses and general industrial uses. Although various methods are employed for production of carbon fiber-reinforced composite materials, a method for using a prepreg, which is an intermediate substrate prepared by impregnating a non-cured matrix resin into reinforcing fibers, is broadly applied. In this method, usually, a formed product of a composite material can be obtained by stacking prepregs and thereafter heating them.

As a matrix resin used for prepregs, thermoplastic resins and thermosetting resins are both used, and resins such as epoxy resins, maleimide resins, cyanate resins and polyimide resins are used.

With respect to mechanical properties of carbon fiber-reinforced composite materials, although the tensile strength thereof has been greatly increased as the tensile strength of carbon fibers increases, increase of the compression strength thereof is small even if high tensile-strength fibers are used instead of standard tensile-strength fibers. Accordingly, flexural strength important for practical uses, which is determined depending upon a smaller strength of either tensile strength or compression strength, is to be determined by the compression strength. Therefore, the compression strength is very important for uses of structural materials on which compression or flexural stress is applied. Particularly, the compression strength is an extremely important property for use as a primary structure material. Further, in a case of an aircraft, since there are many bolt holes, an open-hole compression strength becomes important.

Further, because mechanical property, particularly the compression strength, greatly decreases under a hot-wet condition, an open-hole compression strength under a hot-wet condition, which is a property under a severe condition, becomes a very important index. The open-hole compression strength (referred to as "Open Hole Compression": OHC) is a property determined as a compression strength of a connecting portion, that is, a compression strength at a position corresponding to a portion with a hole for connection, by small-scale measurement.

Further, when used as a primary structure material, a residual compression strength after impact damage due to hailstone or tools also becomes important. Therefore, a compression strength after impact (referred to as "Compression After Impact": CAI), which is determined by small-scale measurement as a residual compression strength after impact damage due to foreign materials such as collision of stones or fall of tools, is one of important properties inevitable for damage tolerance design.

Although a conventional polymer-based composite material has an advantage of light-weight, the above-described open-hole compression strength under a hot-wet condition and compression strength after impact thereof are not still sufficient, and these properties are desired to be further improved for enlarging the range of the applicable uses.

In order to increase the open-hole compression strength, it is known that it is effective to increase the amount of fibers taking charge of load or to increase the stiffness of a resin, but these methods are limited to a certain level. In order to increase the compression strength after impact, it is known that it is effective to increase the amount of a resin or to use a highly-tough resin such as a thermoplastic resin. However, the method for increasing the open-hole compression strength and the method for increasing the compression strength after impact are contrary to each other, and both methods are in a trade-off relationship. Therefore, in a conventional technology, an excellent carbon fiber-reinforced composite material such as one having an open-hole compression strength under a hot-wet condition and a compression strength after impact under a room-temperature condition of each 275 MPa or more has never been obtained.

With respect to noncircular cross-section carbon fibers, many technologies in pitch-based carbon fibers are disclosed. When melt spinning is carried out using pitch as a raw material, a nonuniform crystal structure is created in green fibers by a shear stress during spinning, this is left as a nonuniform crystal structure in carbon fibers after carbonization and is observed as a lamella structure, and only carbon fibers poor in strength and elastic modulus can be obtained.

For example, in technologies disclosed in JP-A-SHO 61-6313, JP-A-SHO 62-117821, JP-A-SHO 62-231024 and JP-A-SHO 62-131034, lamella structures are observed in carbon fibers, and the mechanical properties thereof are low. In particular, pitch-based carbon fibers are low in compression strength as compared with polyacrylonitrile-based carbon fibers and cannot indicate properties which can be applied to a primary structure material.

This presence of a lamella structure can be easily observed as a broken texture extending radially from a center of a broken surface of a carbon fiber toward outside when a transverse cross section obtained by cutting a carbon fiber is observed using a scanning electron microscope (SEM) as described in, for example, JP-A-SHO 61-6313 and JP-A-SHO 62-131034. FIG. 3 is a schematic view of a lamella structure. The lamella structure means a leaf-like orientation structure "a" extending radially in the cross section of a carbon fiber "F" shown in FIG. 3.

As to noncircular cross-section carbon fibers of polyacrylonitrile-based carbon fibers, it is described in a prescript of the twentieth International SAMPE Technical Conference that they can be obtained by melt spinning. In polyacrylonitrile-based carbon fibers, a lamella structure such as one recognized in pitch-based carbon fibers is not observed. However, in order to carry out melt spinning, a large amount of a plasticizer must be added or the molecular weight of a polyacrylonitrile polymer must be decreased. Therefore, the orientation of a precursor is low, and carbon fibers obtained by carbonizing the precursor become poor in mechanical properties. Particularly, in a case where a plasticizer is added at a large amount, the affect is remarkable.

A technology for providing a noncircular cross-section to polyacrylonitrile-based carbon fibers by melt spinning is disclosed in U.S. Pat. No. 5,227,237, and therein it is described that the technology is effective to increase a compression strength of a composite material. However, with respect to combination with a matrix resin, there is only a description that a general thermosetting or thermoplastic resin can be used, and there is no suggestion on a synergetic effect with a resin such as one according to the present invention. In the examples thereof, merely a general epoxy resin is used. Further, with respect to surface treatment after carbonization, there is only a description that it is preferred to apply electrolysis in a sulfuric or nitric solution or oxidation in a gas or liquid phase, there is no particular contrivance, and there is no description as to amount of functional groups on the surface.

According to the investigation by the inventors of the present invention, it has been found that, if the amount of functional groups on the surface is not controlled to a adequate level by contriving surface treatment even in a case of noncircular cross-section carbon fibers, 90° tensile strength which is a typical index of a bonding strength between fibers and a resin is low and cracks due to debonding are likely to occur at an interface between the fibers and the resin. Particularly, in a case where a carbon fiber-reinforced composite material is used as an aircraft primary structure material, such cracks become very serious. Namely, if cracks are generated, water enters into the cracks, the cracks are enlarged by freezing of the water at a low temperature, and the breakage is accelerated. Therefore, it is very important to suppress the generation of cracks.

With respect to surface treatment of carbon fibers, it is well known that it is effective to introduce an oxygen-containing functional group into the surface of carbon fibers for improving a wettability with a matrix resin. It is disclosed in, for example, JP-A-HEI-4-361619, that it is effective to control a surface oxygen concentration of carbon fibers to a specified level. Further, it is disclosed in, for example, JP-B-HEI-4-44016, JP-A-HEI-2-210059, JP-A-HEI-2-169763, JP-A-SHO 63-85167 and JP-A-SHO 62-276075 that it is effective to specify not only surface oxygen concentration but also surface nitrogen concentration for improving bonding property with a matrix resin. Furthermore, it is disclosed in U.S. Pat. No. 5,462,799 that it is effective to control not only surface oxygen concentration or surface nitrogen concentration but also surface hydroxylic concentration and surface carboxylic concentration to specified ranges for improving bonding strength with a resin. However, these technologies are all on circular cross-section carbon fibers, and there is no disclosure with respect to control of amount of functional groups on surface due to surface treatment and contrivance of the surface treatment on noncircular cross-section carbon fibers. Although it has been considered that noncircular cross-section carbon fibers have a high adhesion strength with a resin by so-called anchor effect indicated mechanically by the shape of the cross section, it is not always correct.

On the other hand, in order to increase a compression strength under a hot-wet condition by a technology on a matrix resin, increase of an elastic modulus of the resin is effective, and particularly, it is important to suppress reduction of an elastic modulus under a hot-wet condition. Increase of crosslinking degree of an epoxy resin has been proposed for increasing the elastic modulus of the resin, and reduction of water absorption and introduction of a thermal-resistant structure have been proposed for suppressing reduction of an elastic modulus under a hot-wet hydroscopic condition.

As a resin composition for prepregs balanced in impact resistance, thermal resistance and water resistance, a resin composition blended with an epoxy resin whose main constituent is an epoxy resin having a triglycidylaminophenol structure, diaminophenylsulfone and polyethersulfone or polyetherimide is disclosed in JP-A-SHO 62-297316 and JP-A-SHO 62-297312. However, the epoxy resin having a triglycidylaminophenol structure has a problem that properties under a hot-wet condition greatly decrease as compared with properties under a room-temperature dry condition.

Further, in order to suppress reduction of properties of a cured epoxy resin due to water absorption, a particular diamine curing agent which can reduce water absorption and an epoxy resin blended therewith are disclosed in JP-A-SHO 59-21531 and JP-A-SHO 60-67526. However, when such a particular diamine curing agent is used, it must be added at a large amount, and therefore, the viscosity of the resin becomes too high, and there are problems that the design of the resin is remarkably limited as well as blend of a thermoplastic resin for improving impact resistance, which usually causes a further increase of the viscosity, or layer interface reinforcing technology cannot be applied.

As a resin composition excellent in thermal resistance and flowability during curing process, a blend of 3,3'-diaminodiphenylsulfone and a thermoplastic resin having a glass transition temperature of 100° C. or higher to an epoxy resin is described in JP-B-HEI-7-78138, and therein it is described that it is preferred to blend tetraglycidyldiaminodiphenylmethane at a content of 50 to 80% relative to the whole of the epoxy resin particularly in a case of attaching importance to thermal resistance. However, a cured material of such a resin composition is poor in resin toughness and impact resistance.

As a prepreg excellent in impact resistance, so-called particulate inter-layer toughening technology for adding thermoplastic resin particles to a base resin of a thermosetting resin is disclosed in JP-B-HEI-6-94515. In this, a composition using tetraglycidyldiaminodiphenylmethane at a content of 90% relative to an epoxy resin and 4,4'-diaminodiphenylsulfone at a mole of 0.175 time the mole of the epoxy resin for a base resin of a thermosetting resin and polyethersulfone at a content of 10% is disclosed. However, in such a composition, even if it is effective for increasing compression strength after impact, it is not effective for increasing open-hole compression strength.

Further, another inter-layer toughening technology is disclosed in JP-A-HEI-5-1159 and JP-A-HEI-4-268361, and these disclosures describe examples wherein an epoxy resin prepared from tetraglycidyldiaminodiphenylmethane and triglycidylaminophenol as a base resin, 3,3'-diaminodiphenylsulfone as a curing agent and polysulfone or polyethersulfone oligomer having an amine end group as a thermoplastic resin are used. However, in such a resin composition, even if it is effective for increasing impact resistance, because triglycidylaminophenol is present at a content of 40 to 50% in the epoxy resin, the elastic modulus of the resin under a hot-wet condition is not high, and therefore, the compression strength under a hot-wet condition is insufficient.

DISCLOSURE OF THE INVENTION

An object of the present invention is to provide prepregs and carbon fiber-reinforced composite materials excellent in open-hole compression strength under hot-wet conditions and in compression strength after impact, and can be suitably used especially as an aircraft primary structure material.

To accomplish the above object, a prepreg according to the present invention comprises noncircular cross-section carbon fibers and a matrix resin having a flexural elastic modulus of 2.7 GPa or more and a water absorption of 3.4% or less under a hot-wet condition after curing.

Further, a prepreg according to the present invention comprises carbon fibers and a matrix resin, and a quasi-isotropic material after curing of the prepreg has an open-hole compression strength under a hot-wet condition and a compression strength after impact under a room-temperature condition of each 275 MPa or more.

Further, a prepreg according to the present invention comprises noncircular cross-section carbon fibers and a matrix resin having a flexural elastic modulus of 2.7 GPa or more and a water absorption of 3.4% or less under a hot-wet condition after curing, and a quasi-isotropic material after curing of the prepreg has an open-hole compression strength under a hot-wet condition and a compression strength after impact under a room-temperature condition of each 275 MPa or more.

A carbon fiber-reinforced composite material according to the present invention is obtained by curing the above-described prepregs.

Further, a carbon fiber-reinforced composite material according to the present invention is reinforced by noncircular cross-section carbon fibers and has a ratio of a flexural elastic modulus under a hot-wet condition to a flexural elastic modulus under a room-temperature condition of 0.83 or more.

Further, a carbon fiber-reinforced composite material according to the present invention is produced by curing the above-described prepregs and has a ratio of a flexural elastic modulus under a hot-wet condition to a flexural elastic modulus under a room-temperature condition of 0.83 or more.

In the prepregs and carbon fiber-reinforced composite materials according to the present invention, because an open-hole compression strength under a hot-wet condition, which is the most important property for an aircraft primary structure material, can indicate a high-level value which has never been achieved by the conventional technologies and a compression strength after impact, which is another important property, also can indicate a high-level value, a material well balanced in these properties and suitable as an aircraft primary structure material can be provided.

THE BEST MODE FOR CARRYING OUT THE INVENTION

Figure 1A:
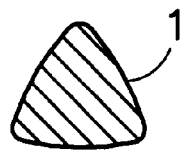
FIGS. 1(A)–(F) are cross-sectional views showing examples of shapes of cross sections of single fibers of carbon fibers applicable to prepregs according to the present invention.
Figure 1B:
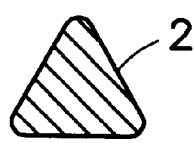

Hereinafter, preferred embodiments of the present invention will be explained with reference to drawings.

First, a prepreg according to the present invention comprises noncircular cross-section carbon fibers and a matrix resin having a flexural elastic modulus of 2.7 GPa or more and a water absorption of 3.4% or less under a hot-wet condition after curing.

Further, a prepreg according to the present invention also can be specified by a characteristic wherein a quasi-isotropic material after curing of the prepreg has an open-hole compression strength under a hot-wet condition and a compression strength after impact under a room-temperature condition of each 275 MPa or more. Carbon fibers used are preferably noncircular cross-section carbon fibers.

Open-hole compression strength and water absorption under room-temperature condition and hot-wet condition are determined by the following methods. Namely, the open-hole compression strength is determined based on BMS8-276C (Boeing Material Specification 8-276, version C). A cured plate having a configuration of $[+45/0/-45/90°]_{2\,S}$ is cut out as a rectangle with a 0° direction size of 12 inches and a 90° direction size of 1.5 inch, a circular hole having a diameter of 0.25 inch is drilled in the central portion to make an open-hole laminate, and a compression test is carried out at a load speed of 1.27 mm/min. under a room-temperature condition (temperature: 21–25° C., relative humidity: 45–55%). The open-hole compression strength under a hot-wet condition is determined by compressing a sample, prepared by dipping a test piece of the open-hole laminate in hot water with a temperature of 72° C. for two weeks, in a constant temperature bath controlled at 82° C. In the examples described later, Instron 1128-type and 4208-type testers were used. The water absorption is calculated from the weights of the test piece for measurement of open-hole compression strength before and after water absorption which are measured by a gravimeter having an accuracy of 1 mg.

The compression strength after impact is determined based on BMS8-276C. A cured laminate having a configuration of $[+45/0/-45/90°]_{2\,S}$ is cut out as a rectangle with a 0° direction size of 6.0 inches and a 90° direction size of 4.0 inches, a drop impact of 270 inch·pound is applied on the center thereof, and a residual compression strength after the impact is determined. In the examples described later, Instron 1128-type tester was used.

Further, a flexural elastic modulus of a carbon fiber-reinforced composite material under a room-temperature condition or a hot-wet condition is determined by the following method. Namely, the flexural elastic modulus under a room-temperature condition is determined based on ASTM-D-790M. A unidirectional cured laminate having a configuration of $[0°]_{1\,2}$ is cut out as a rectangle sample with a width of 25.4 mm and a length of 80 mm, a three-point bending test is carried out at a cross head speed of 3.4 mm/min. setting a span length (a distance between supporting points) to 32 times of the thickness of the specimen, and it is calculated from the flexure-load curve obtained. The flexural elastic modulus under a hot-wet condition (H/W) is determined by measuring a sample, prepared by dipping a test piece in hot water with a temperature of 72° C. for two weeks, in a constant temperature bath controlled at 82° C. by three-point bending test. The waiting time from setting of the sample to loading under the hot-wet condition is 3 minutes.

Further, flexural elastic modulus and water absorption of a resin under room-temperature condition and hot-wet condition are determined by the following methods. Namely, the flexural elastic modulus of a resin under a room-temperature condition is determined based on JIS-K7203. A resin sample piece having a width of 10.0 mm and a length of 60.0 mm is cut out from a injected resin plate having a thickness of 2 mm, a three-point bending test is carried out at a cross head speed of 2.5 mm/min. setting a span length to 32 mm, and it is calculated from the flexure-load curve obtained. The flexural elastic modulus under a hot-wet condition (H/W) is determined by measuring a sample, prepared by boiling a test piece in boiled water with a temperature of 100° C. for 20 hours, in a constant temperature bath controlled at 82° C. by three-point bending test. The waiting time from setting of the sample to loading under the hot-wet condition is 3 minutes. The water absorption of a resin is determined by measuring the weights of the test piece for the bending test before and after water absorption by a gravimeter having an accuracy of 1 mg and calculating from the measured weights.

Although balance of an open-hole compression strength under a hot-wet condition and a compression strength after impact under a room-temperature condition of a quasi-isotropic material is improved by the aforementioned interlayer toughening technology and it is used at present as a recent aircraft primary structure material, even in such a material system it has never been achieved that the open-hole compression strength under a hot-wet condition and the compression strength after impact both can reach a high value satisfying 275 MPa. Therefore, in order to achieve a lighter and higher-performance member of a composite material for an aircraft, both of an open-hole compression strength under a hot-wet condition and a compression strength after impact under a room-temperature condition must be 275 MPa or more, preferably 290 MPa or more, more preferably 300 MPa or more. Particularly, in a case where the material is compared with an aluminum material which is a typical material for an aircraft, the above-described open-hole compression strength under a hot-wet condition and the compression strength after impact must be both 275 MPa or more. Such a requirement of 275 MPa or more can be satisfied by employing the constitution according to the present invention.

Although an open-hole compression strength under a hot-wet condition and a compression strength after impact under a room-temperature condition are both desired to be higher, in consideration of balance with a tensile strength, etc., it is considered that they are preferably about 700 MPa or less.

In the present invention, "noncircular cross-section carbon fibers" means carbon fibers a transverse cross-sectional shape of a single fiber of which is noncircular.

The noncircular cross-section carbon fibers are defined by a condition where a ratio (Pmin) of a minimum geometrical moment of inertia (Imin) to square of a cross-sectional area (A) of a transverse cross section of a single fiber represented by the following equation is 0.085 or more. Namely, although the geometrical moment of inertia varies depending upon directions in case of noncircular cross-section carbon fibers, a value obtained by dividing the minimum value among these varying moments by square of a cross-sectional area is 0.085 or more. When carbon fibers have such a noncircular cross section, the fibers are hard to be buckled against a compression stress, and compression strength, flexural strength and flexural toughness of the composite material increase.

$$Pmin = Imin/A^2$$

Where, Imin: the minimum value among geometrical moments of inertia around axes passing through a center of gravity of a transverse cross section of a single fiber A: area of the transverse cross section of the single fiber Further, it is preferred that a ratio (Pmax) of a maximum geometrical moment of inertia (Imax) to square of a cross-sectional area (A) of a transverse cross section of a single fiber represented by the following equation is large similarly as Pmin, and if the Pmax is large to be 0.13 or more, an advantage for increasing a compression strength can be obtained even if Pmin is 0.019 or more.

$$Pmax = Imax/A^2$$

Where, Imax: the maximum value among geometrical moments of inertia around axes passing through a center of gravity of a transverse cross section of a single fiber A: area of the transverse cross section of the single fiber Although the upper limits of Pmin and Pmax are not particularly restricted, because the Pmin becomes small by making the Pmax large, the upper limits are preferably 0.5 or less.

With respect to the shape of transverse cross section of fibers, a specified noncircular shape, wherein the section has at least one symmetry plane passing through a centroid of the cross section and a rotationally symmetric angle θ defined by θ=360°/n ("n" is an integer from 1 to 10), tends to be hard to be buckled, because the geometrical moment of inertia thereof becomes more isotropic.

"A shape of a transverse cross section of a fiber is rotationally symmetric" means a condition where a completely identical figure is repeated when rotated around the centroid at an angle θ, and the rotational angle thereof means the rotationally symmetric angle. The "symmetry plane" means a boundary plane achieving self identification of right hand and left hand of a figure when the section of a fiber is mirror operated at the boundary plane.

By a condition where the noncircular cross section has a symmetry property, the stress distribution in the sectional plane direction of a composite material relative to the longitudinal direction of the composite material (longitudinal direction of fibers) can be controlled to be uniform. The excellent mechanical properties of carbon fibers can be effectively reflected to a composite material by totalizing these operations.

Figure 1C:
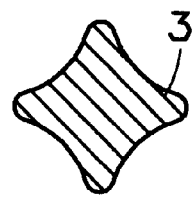

Although there are slight irregularity and variation in transverse cross-sectional shape of fibers depending upon a fiber production process and a slight shift may occur, a similar advantage can be indicated as long as basically the transverse cross-sectional shape can be recognized to be rotationally symmetric. Further, for example, even in a fiber having a nonsymmetric cross section 5 as shown in FIG. 1(E), as long as the above-described Pmin or Pmax is a specified one aforementioned, a corresponding advantage for increasing the compression strength can be obtained. Therefore, such a symmetric property is not always required.

In a transverse cross section of fibers of a regular polygon or a regular multileaf figure, "n" defining the rotationally symmetric angle θ is equal to the number of the corners or leaves. Namely, in sections 1 and 2 close to an equilateral triangle shown in FIGS. 1(A) and (B), the "n" of the rotationally symmetric angle θ is 3, and the number of symmetry planes is also 3. In a section 3 close to a regular four-leaf figure having concavities formed in a direction toward a center of a transverse cross section of a fiber shown in FIG. 1(C), the "n" of the rotationally symmetric angle θ is 4, and the number of symmetry planes is also 4.

On the other hand, in a transverse cross section of fibers of a nonregular polygon or a nonregular multileaf figure, "n" defining the rotationally symmetric angle θ and the number of symmetry planes varies depending upon the deformed shapes thereof. For example, in a case of an isosceles triangle, a longitudinally long pentagon or a heart shape, "n" defining the rotationally symmetric angle θ is 1, and the number of symmetry plane is 1. Also in a case of a long-side section 6 such as one shown in FIG. 1(F), the number of symmetry plane is 1.

Figure 1D:
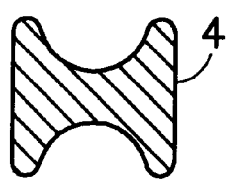
Figure 1E:
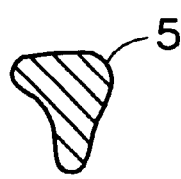
Figure 1F:

Further, in a case of a rectangle, a longitudinally long hexagon, a dog bone shape or a H-shaped section 4 shown in FIG. 1(D), "n" defining the rotationally symmetric angle θ is 2, and the number of symmetry planes is 2.

The upper limit of the "n" defining the rotationally symmetric angle θ is preferably 10, and more preferably 5. Namely, if the "n" is greater than 10, the shape of the transverse cross section of a fiber approaches a circle, and the advantage due to a noncircular cross section decreases.

It is also preferred that a transverse cross section of a carbon fiber is formed as a noncircular figure having concavities formed in a direction toward a center of the cross section of the fiber and the deformation degree is within a certain range. For example, if the section is formed as a figure extremely different from a circle such as a long and slender oblate, the uniform dispersion of carbon fibers when formed as a composite material may be injured and basic properties of the composite material may be decreased.

Figure 4A:
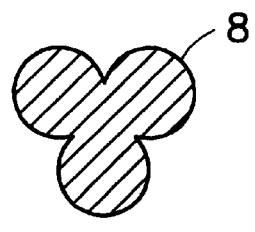
FIGS. 4(A)–(C) are cross-sectional views showing examples of shapes of cross sections of single fibers of carbon fibers applicable to prepregs according to the present invention.

Further, as the shape of a transverse cross section of a single fiber forming carbon fibers used in the present invention, for example, as shown in FIGS. 4(A), (B) and (C), FIGS. 8, 9 and 10, which are formed as multileaf figures and each leaf has a bulge between the root and the tip thereof so that each multileaf figure is formed by substantially combining plural circles, are also preferred. Namely, because an area positioned away from a center of gravity of the transverse cross section of the fiber can be increased by such a figure, the geometrical moment of inertia thereof can be increased.

Figure 2:
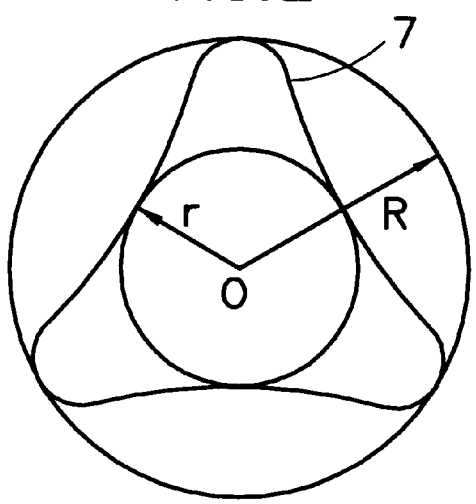
FIG. 2 is a view for explaining definition of a deformation degree "D" of a section of a carbon fiber.
Figure 3A:
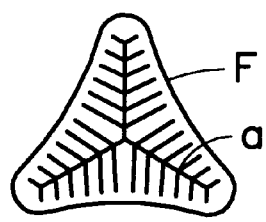
FIGS. 3(A) and (B) are schematic views showing lamella structures in sections of pitch-based carbon fibers.
Figure 3B:
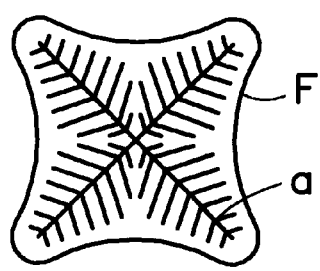

Further, for example, in a section 7 of a three-leaf figure of a carbon fiber shown in FIG. 2, when a ratio R/r of a radius of a circumscribed circle "R" to a radius of an inscribed circle "r" is defined as deformation degree "D", the deformation degree "D" is preferably in the range of 1.1 to 7.0, more preferably in the range of 1.3 to 5.0, and further more preferably in the range of 1.5 to 3.0. Namely, although the deformation degree is preferred to be greater, if it is too great, a deformation of the cross section or a crack thereof may be generated.

In a condition where carbon fibers have such a noncircular cross section, the contact area with a matrix resin can be increased and the bonding strength therebetween can be increased when used for a composite material, and the uniform dispersion of the fibers in the matrix resin can be improved as compared with a case using circular cross-section fibers, and therefore, the basic properties of the composite material can be greatly improved.

Although it is preferred that all the carbon fibers forming a prepreg have such a noncircular cross section as described above, a mixture with circular cross-section fibers or a mixture with different noncircular cross-section fibers may be used.

As aforementioned, the carbon fibers used in the present invention are preferably fibers having a uniform crystal structure whose internal structure does not have a lamella structure in order to indicate high mechanical properties when formed as a composite material. The problem of the generation of such a lamella structure can be solved, for example, by producing carbon fibers using a precursor prepared by dry spinning or dry/wet spinning of a PAN (polyacrylonitrile) polymer.

Further, in the carbon fibers used in the present invention, it is preferred that the surface flatness "S" of the fibers is 1.16 or less and the surface of the fibers has a extremely high flatness without a fine irregularity. If a fine irregularity is present on the surface of carbon fibers, a stress may concentrate at the irregular portion and the portion is likely to become a starting point of breakage, and this causes decrease of the compression strength and the flexural strength particularly when formed as a composite material. In order to obtain such carbon fibers having a flat surface, use of a precursor prepared by dry/wet spinning of a PAN polymer is preferred. Although the lower limit of the surface flatness "S" is not particularly restricted, a value of 1.01 or more is sufficient for obtaining an advantage according to the present invention.

The above-described surface flatness "S" is defined as square of a ratio $(l/l_0)$ of a circumferential length (l) to a circumscribed length $(l_0)$ of a cross section determined by an image analyzer from an enlarged photograph with a magnification of 30,000 times of a cross section of a carbon fiber, prepared by projecting the transverse cross section of the carbon fiber at a magnification of 7,500 times by a SEM and further enlarging it 4 times. Namely, it is a value determined as $S=(l/l_0)^2$. Where, the "circumscribed length $(l_0)$" means a circumferential length of a circumscribed circle of the transverse cross section of the carbon fiber, and the "circumferential length (l)" means an actual circumferential length of the transverse cross section of the carbon fiber.

Such a surface flatness "S" of 1.16 or less can be achieved, for example, by using a precursor prepared by dry/wet spinning of a PAN polymer. Although such a high-level surface flatness may be achieved even by dry spinning or melt spinning, in a precursor prepared by dry spinning, because the volume contraction due to evaporation of a solvent in a spinning raw solution is great, it may be difficult to control the deformation degree of the sectional shape of the fiber within the above-described desired range, and in a precursor prepared by melt spinning, the mechanical properties may not be stable.

Although there are various factors for controlling the transverse properties of a carbon fiber-reinforced composite material, the shape and the specific surface area are important factors as mechanical factors. When the cross-sectional shape of carbon fibers is noncircular, not only a buckling against a compression stress is hard to occur, but also the specific surface area is large and a so-called anchor effect is indicated, and the adhesion strength with a matrix resin can be increased, thereby increasing the compression strength after impact.

However, in order to improve the chemical bonding with a resin, a functional group must be present on the surface and the amount of the functional group is important. Namely, in the carbon fibers used for a prepreg according to the present invention, it is preferred that a surface oxygen concentration O/C (ratio of the numbers of atoms of oxygen O to carbon C) determined by X-ray photoelectric spectrometry is not more than 0.20 and a surface nitrogen concentration N/C (ratio of the numbers of atoms of nitrogen N to carbon C) thereof is not less than 0.02.

The surface oxygen concentration O/C is preferably not more than 0.15, and more preferably not more than 0.10. If O/C is more than 0.20, although the chemical bond between functional groups of a resin and the outermost surface of carbon fibers becomes strong, an oxide layer having a strength fairly lower than a strength, which a substrate of the carbon fibers originally has, covers the carbon fibers, and as a result, the compression property after impact of a composite material obtained may become insufficient.

The lower limit of the surface oxygen concentration O/C is preferably not less than 0.02, more preferably not less than 0.04, and further more preferably not less than 0.06. If the O/C is less than 0.02, increase of the compression strength after impact of a composite material cannot be expected as well as a transverse strength such as 90° tensile strength becomes poor, and a problem that cracks are generated is likely to occur.

The surface nitrogen concentration N/C is not less than 0.02, preferably not less than 0.03, and more preferably not less than 0.04. In carbon fibers with the N/C of less than 0.02, there occurs a case where the reactivity with a sizing agent cannot be improved, and as a result, the advantage for increasing the compression strength after impact due to a sizing agent may not be indicated.

The upper limit of the surface nitrogen concentration N/C is preferably not more than 0.30, more preferably not more than 0.25, and further more preferably not more than 0.20. Namely, if the N/C is more than 0.3, a further increase of the compression strength cannot be expected, and the tensile strength may be decreased.

Further, with respect to kind of the functional group, it is preferred that the surface hydroxylic concentration C—OH/C and the surface carboxylic concentration COOH/C determined by chemically modified X-ray photoelectric spectrometry are controlled in the range of 0.5 to 3.0% and in the range of 0.2 to 2.0%, respectively. More preferably, the C—OH/C and the COOH/C are both in the range of 0.5 to 2.0%.

The bonding strength with a resin can be increased by controlling the surface functional groups in such ranges. By this, the strength for holding carbon fibers by the resin increases, and higher open-hole compression strength and compression strength after impact can be indicated. Particularly, an area being delaminated in a composite material when applied with an impact is decreased, and whereby the compression strength after impact can be increased. Further, 90° tensile strength increases, thereby suppressing generation of cracks at the boundary between carbon fibers and a resin.

Further, even if the amounts of surface functional groups are within the above-described ranges, if an oxide layer is present on the fiber surface, a delamination may occur in the oxide layer or between the oxide layer and the substrate, and the bonding strength with a resin may decrease. Therefore, pH of the fiber surface is preferably controlled not less than 6, more preferably not less than 6.5, and further more preferably not less than 7. Since there is only a small amount of impurities generated due to absorption of $CO_2$, $SO_2$, etc. in the atmosphere or fragile graphite oxide generated by surface treatment when the pH of the fiber surface is controlled to be not less than 6, delamination in these impurities or the oxide layer or between the oxide layer and the substrate of the carbon fibers is hard to occur, the adhesion property with a resin is good, and as a result, a desired compression strength can be easily indicated.

Because the functional groups on the carbon fiber surface can activate a matrix resin near the surface to a further extent by being pH of not less than 6, it is considered that the reactivity between the functional groups on the fiber surface and the matrix resin can be improved by combination with a specified amount of functional groups and therefore curing of the matrix resin can be accelerated.

On the other hand, if the pH is less than 6, there exist a large amount of impurities and fragile oxides on the surface of the fibers, and the reactivity and the amount of reaction between a matrix resin and functional groups on carbon fibers may be insufficient. As a result, the compression strength after impact of a composite material may not be increased.

Although the upper limit of the pH is not particularly restricted, it is preferably not more than 10, more preferably not more than 8, from the viewpoint of safety.

Where, the surface oxygen concentration O/C and the surface nitrogen concentration N/C of carbon fibers are determined by the following methods.

Namely, the surface oxygen concentration O/C is determined based on the following method by X-ray photoelectric spectrometry. Firstly, after a bundle of carbon fibers, from which sizing agent etc. have been removed by a solvent, is cut and placed while extended on a sample supporting table made of a stainless steel, the escape angle of photoelectron is set to 90°, MgK $\alpha_{1,2}$ is used as a source of X-ray, and the interior of a sample chamber is controlled at a vacuum degree of $1 \times 10^{-8}$ Torr. To correct peak against electric charge at the time of determination, initially the value of binding energy of a main peak of $C_{1S}$ is set to 284.6 eV. $C_{1S}$ peak area is determined by drawing a straight base line within the range of 282 to 296 eV, and $O_{1S}$ peak area is determined by drawing a straight base line within the range of 528 to 540 eV. The surface oxygen concentration O/C is represented by a ratio of the number of atoms calculated by dividing a ratio of $O_{1S}$ peak area to $C_{1S}$ peak area by a sensitivity correction factor specified for an apparatus. In the examples described later, ESCA-750 produced by Shimadzu Seisakusyo Corporation was used and the sensitivity correction factor specified for the apparatus was 2.85.

The surface nitrogen concentration N/C is determined based on the following method by X-ray photoelectric spectrometry. Firstly, after a bundle of carbon fibers, from which sizing agent etc. have been removed by a solvent, is cut and placed while extended on a sample supporting table made of a stainless steel, the escape angle of photoelectron is set to 90°, MgK $\alpha_{1,2}$ is used as a source of X-ray, and the interior of a sample chamber is controlled at a vacuum degree of $1 \times 10^{-8}$ Torr. To correct peak against electric charge at the time of determination, initially the value of binding energy of a main peak of $C_{1S}$ is set to 284.6 eV. $C_{1S}$ peak area is determined by drawing a straight base line within the range of 282 to 296 eV, and $N_{1S}$ peak area is determined by drawing a straight base line within the range of 398 to 410 eV. The surface nitrogen concentration N/C is represented by a ratio of the number of atoms calculated by dividing a ratio of $N_{1S}$ peak area to $C_{1S}$ peak area by a sensitivity correction factor specified for an apparatus. In the examples described later, ESCA-750 produced by Shimadzu Seisakusyo Corporation was used and the sensitivity correction factor specified for the apparatus was 1.7.

Further, the surface hydroxylic concentration (C—OH/C) and the surface carboxylic concentration (COOH/C) of carbon fibers are determined by the following methods.

Namely, the surface hydroxylic concentration C—OH/C is determined based on the following method by X-ray photoelectric spectrometry. Firstly, a bundle of carbon fibers, from which sizing agent etc. have been removed by a solvent, is cut and placed while extended on a sample supporting table made of a platinum, after the sample is chemically modified by exposing it in a dry nitrogen gas containing 0.04 mol/l anhydrous acetic trifluoride gas at a room temperature for ten minutes, the escape angle of photoelectron is set to 35°, AlK $\alpha_{1,2}$ is used as a source of X-ray, and the interior of a sample chamber is controlled at a vacuum degree of $1 \times 10^{-8}$ Torr. To correct peak against electric charge at the time of determination, initially the value of binding energy of a main peak of $C_{1\ S}$ is set to 284.6 eV. $C_{1\ S}$ peak area is determined by drawing a straight base line within the range of 282 to 296 eV, and $F_{1\ S}$ peak area is determined by drawing a straight base line within the range of 682 to 695 eV. At the same time, a reactivity rate "r" is determined from $C_{1\ S}$ peak division of chemically modified polyvinyl alcohol. The surface hydroxylic concentration C—OH/C is calculated by the following equation.

$$C-OH/C(\%)=[F_{1\ S}] \times 100/\{3k[C_{1\ S}]-2[F_{1\ S}]r\}$$

Where, "k" is a sensitivity correction factor specified for the apparatus of $F_{1\ S}$ peak area relative to $C_{1\ S}$ peak area. In the examples described later, Model SSX-100-206 produced by SSI Corporation of a U.S. company was used and the sensitivity correction factor specified for the apparatus was 3.919.

The surface carboxylic concentration COOH/C is determined based on the following method by X-ray photoelectric spectrometry. Firstly, a bundle of carbon fibers, from which sizing agent etc. have been removed by a solvent, is cut and placed while extended on a sample supporting table made of a platinum, after the sample is chemically modified by exposing it in an air containing 0.02 mol/l anhydrous ethanol trifluoride gas, 0.001 mol/l dicyclohexylcarbodiimide gas and 0.04 mol/l pyridine gas at 60° C. for 8 hours, the escape angle of photoelectron is set to 35°, AlK $\alpha_{1,2}$ is used as a source of X-ray, and the interior of a sample chamber is controlled at a vacuum degree of $1 \times 10^{-8}$ Torr. To correct peak against electric charge at the time of determination, initially the value of binding energy of a main peak of $C_{1\ S}$ is set to 284.6 eV. $C_{1\ S}$ peak area is determined by drawing a straight base line within the range of 282 to 296 eV, and $F_{1\ S}$ peak area is determined by drawing a straight base line within the range of 682 to 695 ev. At the same time, a reactivity rate "r" is determined from $C_{1\ S}$ peak division of chemically modified polyacrylic acid and a residue rate "m" of a derivative of dicyclohexylcarbodiimide is determined from $O_{1\ S}$ peak division thereof. The surface carboxylic concentration COOH/C is calculated by the following equation.

$$COOH/C(\%)=[F_{1\ S}] \times 100/\{3k[C_{1\ S}]-(2+13m)[F_{1\ S}]r\}$$

Where, "k" is a sensitivity correction factor specified for the apparatus of $F_{1\ S}$ peak area relative to $C_{1\ S}$ peak area. In the examples described later, Model SSX-100-206 produced by SSI Corporation of a U.S. company was used and the sensitivity correction factor specified for the apparatus was 3.919.

Further, the pH of carbon fiber surface is determined from pH of an extracted water. Namely, carbon fibers of 5 g, before being provided with a sizing agent and dried in a hot air oven at 100° C. for 20 minutes, is sampled in a conical flask, a distilled water of 100 ml controlled at a pH of 7.0 is added into the conical flask, a nitrogen gas is flown on the liquid surface and it is left for about 30 hours. After a supersonic wave (frequency: 47 kHz, output of high frequency: 80 W) is radiated for 20 minutes, pH of an extracted water obtained is determined. In the examples described later, "BRANSONIC" B-2200 produced by Yamato Kagaku Corporation was used as a supersonic wave radiator and HM-7E produced by Toua Denpa Corporation was used as a pH measuring apparatus.

As another characteristic of noncircular cross-section fibers, there is an advantage that, because the minimum distance from the surface of a single fiber to the center thereof is short as compared with a case of circular-section fibers, diffusion of oxygen up to the center is facilitated in a oxidation process, more uniform carbonization becomes possible and the strength and elastic modulus of carbon fibers increase. It is understood that the resistant property against a flexural deformation increases by the advantage, thereby increasing compression strength and flexural strength.

As the mechanical properties of the above-described carbon fibers used in the present invention, a tensile strength of the carbon fibers determined in a form of a resin impregnated strand is preferably 3 GPa or more, more preferably 4 GPa or more, and further more preferably 5 GPa or more. Further, a tensile elastic modulus of the carbon fibers is preferably 200 GPa or more, more preferably 240 GPa or more, and further more preferably 280 GPa or more. In a case of carbon fibers where the above-described strand strength is less than 3 GPa or the elastic modulus is less than 200 GPa, when formed as a composite material, desired properties for a structural material may not be obtained.

The tensile strength and the tensile elastic modulus of carbon fibers are determined by the following methods. Namely, the tensile strength and the tensile elastic modulus of carbon fibers are properties of an epoxy resin impregnated strand determined based on JIS-R-7601, and they are mean values of 10 strands.

Next, examples of the processes for producing the above-described carbon fibers used in the present invention will be explained. The surface treatment and sizing treatment of carbon fibers are as follows, but the conditions of polymerization, fiber formation and heat treatment are not particularly restricted.

In order to produce the carbon fibers used in the present invention, for example, precursor of acrylic-based fibers is used. To produce the precursor, a copolymer, whose main constituent is acrylonitrile (hereinafter, referred to as "AN") and which is prepared by AN of 95 mol % or more, preferably 98 mol % or more, and a vinyl group containing compound (hereinafter, referred to as "vinyl monomer") of 5 mol % or less, preferably 2 mol % or less, that accelerates the oxidation reaction and has a copolymerizable property with AN, is used.

As the vinyl monomer having a function for accelerating the oxidation, for example, acrylic acid, methacrylic acid, itaconic acid, alkali metal salts thereof, ammonium salt, $\alpha$(1-hydroxylethyl)acrylonitrile, acrylic hydroxylester, etc. are appropriate.

Further, except such vinyl monomers having a function for accelerating the oxidation, in order to improve spinning or drawing processibility of AN polymer, a third component such as lower alkylesters of the above-described acrylic acid or methacrylic acid, allylsulfonic acid, methallylsulfonic acid, styrene sulfonic acid, alkali metal salts thereof, vinyl acetate or vinyl chloride may be copolymerized at the total amount of the copolymerized component of 5 mol % or less, preferably 2 mol % or less. Such a copolymer for AN polymer can be polymerized using a polymerization process such as emulsion polymerization, block polymerization or solution polymerization.

In order to produce acrylic-based fibers from these polymers, a polymer solution containing a solvent such as dimethylformamide, dimethylsulfoxyde, nitric acid, rhodan soda water solution or zinc chloride water solution is prepared as a raw solution for spinning, and wet or dry/wet spinning is carried out. To obtain fibers having a flat surface as aforementioned, dry/wet spinning or wet spinning in a system containing rhodan soda or zinc chloride slow in coagulation is preferred.

For a spinneret hole, a slit-like or noncircular shape corresponding to the shape of final fibers is preferred to obtain noncircular cross-section fibers. In a case of dry/wet spinning, because combining is possible before entering into a coagulation bath after discharge, it is preferred that circular or noncircular small holes are disposed corresponding to the shape of a final fiber. In a case of noncircular shape having a symmetry property, preferably it has a rotationally symmetric angle θ defined by θ=360°/n ("n" is an integer from 1 to 10) as well as it has at least one symmetry plane passing through a centroid of the section.

Examples of shapes of spinneret holes will be shown in FIGS. 5(A)–(F). The shapes of cross sections of fibers produced by spinning from these spinneret holes formed from continuous slits 11, 12, 13, 14, 15 and 16 shown in FIGS. 5(A)–(F) indicate the shapes 1, 2, 3, 4, 5 and 6 shown in FIG. 1(A)–(F), respectively.

The fibers having such cross-sectional shapes almost maintain the cross-sectional shapes after the fibers are carbonized and changed to carbon fibers. Therefore, the deformation degree "D" of the section of a fiber prepared as a precursor is also preferably in the range of 1.1 to 7.0, more preferably in the range of 1.2 to 6.0, and further more preferably in the range of 1.3 to 5.0, similarly to in the carbon fibers as aforementioned.

Figure 4B:
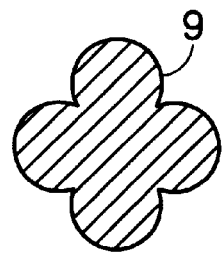
Figure 4C:
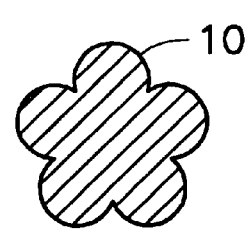
Figure 6A:
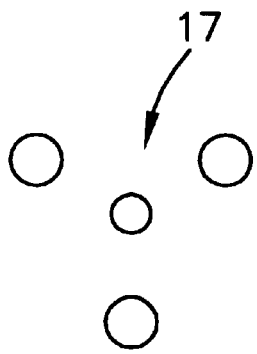
FIGS. 6(A)–(C) are schematic views showing spinneret holes for spinning carbon fibers shown in FIGS. 4(A)–(C).
Figure 6B:
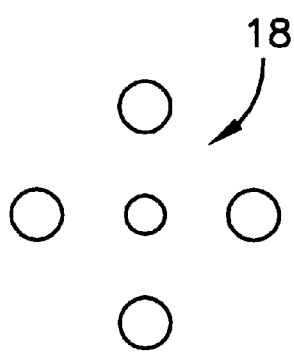
Figure 6C:
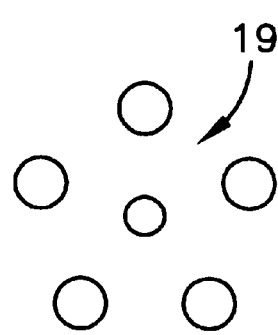

The spinneret hole may be formed as plural small holes 17, 18 and 19 as shown in FIGS. 6(A)–(C). The cross sections of the fibers produced by spinning from the spinneret holes 17, 18 and 19 shown in FIGS. 6(A)–(C) indicate the shapes 8, 9 and 10 shown in FIGS. 4(A)–(C), respectively.

In a dry/wet spinning, a polymer solution is discharged from spinneret holes into an air or inert atmosphere, and thereafter, immediately introduced into a coagulation bath storing a coagulation solution. The coagulation bath comprises a solvent of PAN and a coagulant. As the coagulant, for example, water, methanol and acetone can be employed, and among these, water is suitable from the viewpoint of safety or recycling.

The coagulated fibers obtained are stretched in a hot water after washing by water, and thereafter, a process oil is applied to the fibers at an amount of 0.2 to 2 wt. % relative to the weight of dry fibers. As the component of the oil, particularly a silicone-based compound or a silicone-based compound modified with an amino group or an epoxy group, which is effective to prevent sticking between single filaments during carbonization, is preferred.

After providing the process oil, dry and densification treatment is carried out and dense fibers are obtained. Thereafter, as needed, a secondary stretching is carried out, for example, in a steam.

The size of a single fiber of a precursor thus obtained is preferably in the range of 0.1 to 2.5 denier, more preferably in the range of 0.2 to 2.0 denier, and further more preferably in the range of 0.3 to 1.5 denier. If less than 0.1 denier, breakage of a single fiber is likely to occur, and if more than 2.5 denier, uniform carbonization in a single filament from the outside to the inside portion thereof becomes difficult and it may be difficult to obtain carbon fibers having excellent properties. In order to achieve a uniform carbonization, the size is preferred to be not more than 2.5 denier.

The precursor thus produced is oxidized in air at a temperature of about 200 to 300° C., and thereafter, carbonized in an inert atmosphere at a temperature of 1,000 to 2,000° C. to be converted into carbon fibers. If the carbon fibers are graphitized at a temperature of 2,000 to 3,000° C. as needed, they are converted into graphite fibers. Although the conditions of these processes are not particularly restricted, to oxidize or carbonize under tension, to optimize oxidation degree and to prevent too excessive temperature elevation speed so as to suppress generation of structural defects such as voids inside the fibers are important. For example, as the condition of the carbonization process in an inert atmosphere such as a nitrogen gas, the temperature elevation speeds in the temperature ranges of 300 to 700° C. and 1,000 to 1,200° C. are controlled preferably at a speed of not higher than 1,000° C./min., more preferably not higher than 500° C./min.

With respect to surface treatment, although various surface treatments such as gaseous phase oxidation and electrolytic oxidation are investigated, the electrolytic oxidation, in which oxidation can be carried out in a short period of time and the degree of the oxidation can be easily controlled, is preferred. As the electrolytic solution for the electrolysis, an acidic one and an alkaline one can be both employed. As the acidic electrolyte, it may indicate an acidic property in a water solution, and concretely, an inorganic acid such as sulfuric acid, nitric acid, hydrochloric acid, phosphoric acid, boric acid or carbonic acid, an organic acid such as acetic acid, butyric acid, oxalic acid, acrylic acid or maleic acid and a salt such as ammonium sulfate or ammonium hydrogensulfate can be employed. Preferably sulfuric acid or nitric acid indicating a strong acidic property are desired. As the alkaline electrolyte, it may indicate an alkaline property in a water solution, and concretely, a hydroxide such as sodium hydroxide, potassium hydroxide or barium hydroxide, ammonia, an inorganic salt such as sodium carbonate or sodium bicarbonate, a water solution of an organic salt such as sodium acetate or sodium benzoate, a potassium salt or barium salt thereof or other metal salts, ammonium salt thereof, and an organic compound such as hydrazine can be employed. Preferably ammonium carbonate, ammonium bicarbonate or tetraalkylammonium hydroxide containing no alkali metal causing obstruction to curing of a resin is desired.

With respect to the amount of functional groups, the carbon fibers, in which the aforementioned surface oxygen concentration O/C and surface nitrogen concentration N/C determined by X-ray photoelectric spectrometry are controlled in the aforementioned specified ranges, can be obtained by electrolytic oxidation in an ammonium salt water solution.

The electrolytic solution for this electrolytic oxidation may be a water solution containing ammonium ion. More concretely, as such an electrolyte, for example, ammonium nitrate, ammonium sulfate, ammonium persulfate, ammonium chloride, ammonium bromide, ammonium dihydrogenphosphate, diammonium hydrogenphosphate, ammonium hydrogencarbonate, ammonium carbonate, or mixture thereof can be employed. Among these, ammonium sulfate, ammonium nitrate, ammonium chloride, ammonium carbonate and ammonium hydrogencarbonate are preferred, and particularly, ammonium carbonate and ammonium hydrogencarbonate are preferred because residue on the surface of carbon fibers after washing by water and after drying is little.

The concentration of the electrolytic solution is preferably in the range of 0.01 to 5 mol/l, more preferably in the range of 0.1 to 1 mol/l. Namely, although the electrolysis voltage decreases as the concentration is higher, if so, the oder becomes strong and the environment deteriorates, and therefore, the concentration is preferred to be optimized therefrom.

The temperature of the electrolytic solution is preferably in the range of 0 to 100° C., more preferably in the range of 10 to 40° C. Namely, because the oder becomes strong and the environment deteriorates if the temperature is high, the temperature is preferred to be low, and such a temperature is preferred to be optimized in consideration of running cost.

The quantity of electricity is preferred to be optimized in accordance with the carbonization degree of carbon fibers to be treated, and a greater quantity of electricity is required for fibers having a high elastic modulus. From the viewpoint of accelerating the reduction of crystallinity of the surface layer and improving the productivity as well as preventing the reduction of the strength of the substrate of carbon fibers, the electrolytic oxidation is preferably carried out repeatedly a plurality of times at a small quantity of electricity. Concretely, an applied quantity of electricity per one electrolysis bath is preferably not less than 5 coulomb/g·bath (amount of coulomb per carbon fibers of 1 g and one bath) and not more than 100 coulomb/g·bath, more preferably not less than 10 coulomb/g·bath and not more than 80 coulomb/g·bath, and further more preferably not less than 20 coulomb/g·bath and not more than 60 coulomb/g·bath. Further, from the viewpoint of controlling the reduction of crystallinity of the surface layer in an adequate range, the total quantity of electricity applied is controlled preferably in the range of 5 to 1,000 coulomb/g, more preferably in the range of 10 to 500 coulomb/g.

The number of the baths is preferably not less than 2, more preferably not less than 4. It is preferably not more than 10 from the viewpoint of the plant cost, and the number is preferably optimized from the quantity of electricity, voltage, density of current, etc.

The density of current is preferably not less than 1.5 $A/m^2$ and not more than 1,000 $A/m^2$ per surface area of 1 $m^2$ of carbon fibers in an electrolytic solution, more preferably not less than 3 $A/m^2$ and not more than 500 $A/m^2$, from the viewpoint of effectively oxidizing the carbon fiber surface and ensuring safety. The treatment time is preferably in the range of several seconds to ten and several minutes, more preferably in the range of about 10 seconds to 2 minutes.

The voltage of the electrolysis is preferably not more than 25 V, more preferably in the range of 0.5 to 20 V, from the viewpoint of safety. Although the electrolysis treatment time should be optimized in accordance with the quantity of electricity and the density of electrolyte, it is preferably in the range of several seconds to 10 minutes, more preferably in the range of about 10 seconds to 2 minutes, from the viewpoint of productivity. Although the type of the electrolysis may be either batch type or continuous type, the continuous type indicating a good productivity and capable of suppressing variation small is more preferred. As the method for the electrolysis, a direct method, namely contacting carbon fibers onto an electrode roller directly, and an indirect method via an electrolytic solution present between carbon fibers and an electrode can be both employed. The indirect method is more preferred because it can suppress generation of fluffs and electric spark during electrolysis treatment.

Further, the process for electrolysis treatment may be carried out either by passing fibers once though electrolysis baths arranged by a required number or by passing fibers a plurality of times. The length of an anode of the electrolysis bath is preferably in the range of 5 to 100 mm, and the length of a cathode thereof is preferably in the range of 300 to 1,000 mm, more preferably in the range of 350 to 900 mm.

After electrolytic oxidation or washing, the fibers are preferably washed by water and dried. In this case, because the functional groups present on the outermost surface of carbon fibers are likely to disappear if the temperature for drying is too high, the drying is preferably carried out at a temperature as low as possible, and concretely, the temperature for drying is preferably not more than 250° C., more preferably not more than 210° C.

Further, the carbon fibers used in the present invention are preferably in a condition where the pH of the fiber surface is not less than 6, as aforementioned. In order to obtain such carbon fibers, a method may be employed wherein the fibers are electrolytically oxidated in a solution of an ammonium salt and thereafter the fibers are washed using an alkali aqueous solution with a pH of not less than 7, preferably not less than 8, more preferably not less than 10, and washed by water. As an example of such an alkali aqueous solution, an aqueous solution of a salt such as ammonium carbonate, ammonium hydrogen-carbonate or tetraalkyl ammonium hydroxide can be employed.

Although the surface-treated carbon fibers can be used as they are, a sizing agent is provided in order to improve the bindability or the handling ability. The sizing agent is not particularly restricted, an epoxy compound, a polyester compound, a polyimide compound, a bismaleimide compound, a polyurethane compound, etc. can be used. From the viewpoint of safety, a water-system one, that is, a water-soluble one or a water emulsion prepared using a surfactant is preferred. The amount of the sizing agent provided may be controlled in the range of 0.1 to 10 wt. %, preferably in the range of 0.2 to 2 wt. %.

Because the decomposition of a sizing agent due to heat or water absorption is likely to cause reduction of mechanical properties of a composite material under a hot-wet condition, the sizing agent preferably has a high thermal resistance and a low water absorption property. Concretely, one having a condensed multi-aromatic ring is preferred. Where, naphthalene, anthracene, pyrene, etc. can be employed as the condensed multi-aromatic ring, and among these, naphthalene indicating a good handling ability is preferred. More concretely, 1,6-naphthalene diglycidylether is preferred.

Further, in a case where a resin having a high curing temperature such as a polyimide resin is used, the thermal resistance of a sizing agent is also important. Namely, if the thermal resistance is low, it is decomposed during curing to cause voids, and therefore the mechanical properties of the composite material to be obtained decrease. As a sizing agent having a high thermal resistance, a polyimide compound is preferred, and a water-system one is more preferred from the viewpoint of safety. Concretely, a water emulsion wherein a bisallylnadiimide compound is emulsified with a small amount of a surfactant is preferred. The surfactant is preferably a nonion type one.

It is possible to obtain a prepreg capable of indicating an excellent compression strength aimed when formed as a fiber reinforced composite material by combining the carbon fibers described hereinabove in detail with a matrix resin described as follows.

The flexural elastic modulus under a hot-wet condition of a matrix resin used in the present invention is 2.7 GPa or more, preferably 2.85 GPa or more, more preferably 3 GPa or more, and further more preferably 3.2 GPa or more. If the flexural elastic modulus under a hot-wet condition is less than 2.7 GPa, the compression strength of the reinforcing fibers cannot be effectively transformed, and as a result, the composite material indicates a poor compression strength under a hot-wet condition.

Although the upper limit of the flexural elastic modulus is preferred as it is higher from the viewpoint of compression strength, because the toughness of a resin tends to be decreased when it is higher, it is considered that the upper limit is preferred to be 6 GPa or less from total judgement.

Further, the water absorption of a matrix resin used in the present invention is 3.4% or less, preferably 3.0% or less, more preferably 2.8% or less, and further more preferably 2.0% or less. If the water absorption is more than 3.4%, deterioration of a matrix resin in a composite material under a hot-wet condition, particularly, debonding or breakage at an interface in the composite material, is accelerated, and as a result, the compression strength under a hot-wet condition greatly decreases.

Although 0% is ideal as to the water absorption of a matrix resin, controlling to 0% is very difficult in practice, and a condition of 0.1% or more is sufficient to obtain an advantage according to the present invention.

The water absorption and the elastic modulus under a hot-wet condition are determined by the following methods. After a matrix resin composition is vacuum degassed, it is formed as a cured plate by forming in a hot air oven. The curing is carried out under a condition of the same temperature profile as that of forming a composite material. The water absorption is determined from a weight before water absorption of an obtained resin plate (60×10×2 mm) dried in a hot air oven at 120° C. for 20 hours and a weight after water absorption of the plate boiled in a hot water with a temperature of 100° C. for 20 hours. The determination of the flexural elastic modulus is carried out at 82° C. by three point bending method on a formed plate (60×10×2 mm) after boiling and water absorption in a hot water with a temperature of 100° C. for 20 hours. The span length is set to 32 mm, and the cross head speed is set 2.5 mm/min.

As a matrix resin used in the present invention, there is a resin which contains (A) a cyanic ester resin, or a mixture or a prereactant of a maleimide resin and a cyanic ester resin, (B) an epoxy resin and (C) a thermoplastic resin having a glass transition temperature of 180° C. or more,
   and wherein the epoxy resin (B) contains at least one of the following (B1), (B2) and (B3):
   (B1) a glycidylamine type epoxy resin having three or more glycidyl groups in a single molecule,
   (B2) an epoxy resin having a condensed aromatic ring in its skeleton and
   (B3) a glycidylether type epoxy resin.

The maleimide resin is a compound having a plurality of maleimide groups in its molecule, and, for example, methylenebis-p-phenylenedimaleimide can be employed.

The cyanic ester resin a compound having a plurality of cyanate groups in its molecule, and, for example, bisphenol-A-dicyanate, bisphenol-F-dicyanate and a cyanic ester of a novolak oligomer can be employed.

In the above-described mixture or prereactant of a maleimide resin and a cyanic ester resin, it is preferred that the maleimide resin is methylenebis-p-phenylenedimaleimide and the cyanic ester resin is bisphenol-A-dicyanate. In this case, the weight ratio of methylenebis-p-phenylenedimaleimide to bisphenol-A-dicyanate is preferably in the range of 30:70 to 0:100. The ratio of "0:100" means a condition where a maleimide resin is zero, and the above-described composition (A) consists of only a cyanic ester resin.

In the mixture or prereactant of a maleimide resin and a cyanic ester resin, a temperature required for curing is high if it is in a condition as it is, and there is a limitation in practical use. In practice, 180° C. or less is preferred as the curing temperature. To optimize the curing temperature, a radical initiator and an epoxy resin are blended. When only a cyanic ester resin is used, a radical initiator is not necessary.

As the radical initiator to be blended, an organic peroxide such as dicumyl peroxide is preferably used. Although a bisphenol A epoxy resin or a bisphenol F epoxy resin is generally used as the epoxy resin to be blended, when these are used, the compression strength under a hot-wet condition of a fiber reinforced composite material becomes insufficient.

The glycidylamine type epoxy resin is a compound having one or more glycidylamine groups in a single molecule, and it may further have a glycidyloxy group. As the glycidylamine type epoxy resin having three or more glycidyl groups in a single molecule (B1), particularly tetraglycidyldiaminodiphenylmethane type epoxy resin is preferred, and N,N,N',N'-tetraglycidyl-4,4'-methylenebisbenzeneamine is more preferred.

As the epoxy resin having a condensed aromatic ring in its skeleton (B2), an epoxy compound having at least one condensed aromatic ring such as naphthalene, phenanthrene, anthracene, pyrene, coronene or fluorene and two or more glycidyl groups in its skeleton is preferred. In such a structure, because a bulky structure is present in the skeleton, a rigid curing structure can be formed, and a cured product having a high thermal resistance and a high elastic modulus can be obtained. Particularly, diglycidyloxynaphthalene is preferred from the viewpoint of toughness and handling ability.

As the glycidylether type epoxy resin (B3), an epoxy resin represented by the following formula (1) is preferred.

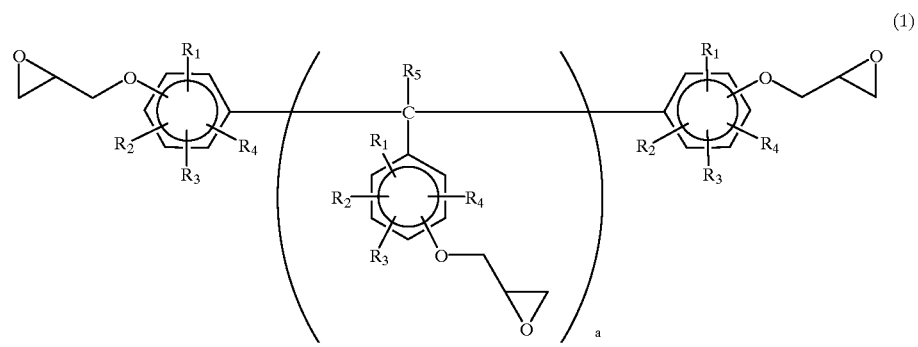

(1)

In the formula, "a" represents 1 or 2, and R1–R5 are independent and represent hydrogen, halogen and alkyl group having a carbon number of 4 or less, respectively.

As the (B3), particularly, tris(4-glycidyloxyphenyl) methane or 1,1,2,2-tetrakis(4-glycidyloxyphenyl)ethane is preferred from the viewpoint of thermal resistance.

As the thermoplastic resin having a glass transition temperature of 180° C. or more (C), a polysulfone or a polyimide is preferred, and one having an ether bond in its skeleton is more preferred. As the polysulfone, a polymer comprising a diaromatic group, an ether bond and a sulfonyl group is preferred. The molecular weight thereof is preferably in the range of 2,000 to 25,000 in number average molecular weight.

In the prepreg according to the present invention, although the blend ratio is not particularly restricted as long as the above-described components (A), (B) and (C), in order to efficiently increase the compression strength under a hot-wet condition, the weight ratio of the mixture or the prereactant (A) to the epoxy resin (B) is preferably in the range of 70:30 to 90:10. Further, the weight ratio of sum of the mixture or the prereactant (A) and the epoxy resin (B) to the polyethersulfone (C) is preferably in the range of 100:2 to 100:20.

Further, as a matrix resin used in the present invention, there is a resin which contains (B) an epoxy resin,
(C) a thermoplastic resin having a glass transition temperature of 180° C. or more and
(D) a diamine compound which has one through three phenyl groups in its skeleton and wherein two bond groups each coupled to an amino group are coupled to meta positions of at least one phenyl group of the phenyl groups,
and wherein the epoxy resin (B) contains at least one of the following (B1), (B2) and (B3):
(B1) a glycidylamine type epoxy resin having three or more glycidyl groups in a single molecule,
(B2) an epoxy resin having a condensed aromatic ring in its skeleton and
(B3) a glycidylether type epoxy resin.

The epoxy resins (B1), (B2) and (B3) and the thermoplastic resin (C) are the same as those in the matrix resin aforementioned.

In this composition of a matrix resin, preferably 70 wt. % or more of the epoxy resin (B) is composed of compounds selected from the above-described (B1), (B2) and (B3), and as long as this condition is satisfied, the remaining component of the epoxy resin (B) is not particularly restricted. It is more preferred that 80 wt. % or more of the main constituent of the epoxy resin is tetraglycidyldiaminodiphenylmethane type epoxy resin. As a concrete example of tetraglycidyldiaminodiphenylmethane type epoxy resin, N,N,N',N'-tetraglycidyl-4,4'-methylenebisbenzeneamine is preferred.

The remaining component is not particularly restricted, and a compound having a plurality of epoxy groups in its molecule. For example, a bisphenol A epoxy resin, a bisphenol F epoxy resin, a bisphenol S epoxy resin, a bisphenol B epoxy resin, a naphthalene type epoxy resin, a novolak type epoxy resin, an epoxy resin having a fluorene, an epoxy resin prepared from a copolymer of a phenolic compound and a dicyclopentadiene, a glycidylether type epoxy resin such as diglycidylresolcinol, tetrakis(glycidyloxyphenyl)ethane or tris(glycidyloxyphenyl) methane, a glycidylamine type epoxy resin such as triglycidylaminophenol, triglycidylaminocresol or tetraglycidylxylenediamine, or combination thereof can be employed.

Among these compounds, a blend of tetraglycidyldiaminodiphenylmethane and an epoxy resin having two or more epoxy groups in a single molecule. In this case, as the epoxy resin having two or more epoxy groups in a single molecule, a bisphenol F epoxy resin, a bisphenol A epoxy resin or diglycidylresolcinol is preferred, and a bisphenol F epoxy resin is more preferred.

As the diamine compound (D) which has one through three phenyl groups in its skeleton and wherein two bond groups each coupled to an amino group are coupled to meta positions of at least one phenyl group of the phenyl groups, 3,4'-diaminodiphenylsulfone, 3,3'-diaminodiphenylsulfone, 3,4'-diaminodiphenylmethane, 3,3'-diaminodiphenylmethane, 3,4'-diaminodiphenylether and alkyl substituted derivatives thereof are preferred. Among these, 3,4'-diaminodiphenylsulfone and 3,3'-diaminodiphenylsulfone are preferred because their usable times are long, and 3,3'-diaminodiphenylsulfone is more preferred.

Although the composition where the active hydrogen of amino groups of the diamine compound (D) react the epoxy groups of the epoxy resin at a ratio of 1:1 is a composition where the mole number of the diamine compound (D) in a matrix resin is 0.25 time the mole number of the epoxy groups in the epoxy resin, in order to obtain an excellent compression strength, a composition where the mole number of the diamine compound (D) in a matrix resin is in the range of 0.15 to 0.2 time the mole number of the epoxy groups in the epoxy resin is preferred.

As the thermoplastic resin (C) having a glass transition temperature of 180° C. or more, a polysulfone, a polyimide, a polyketone, an aromatic polyester, etc. are preferred. Among these, a polysulfone or a polyimide is preferred because of high thermal resistance and toughness. Further, one having an ether bond in a skeleton is more preferred.

The content of this constitutional element (C) is preferably in the range of 1 to 15 wt. % relative to the weight of the epoxy resin, more preferably in the range of 5 to 10 wt. %.

Further, for use requiring a higher thermal resistance such as use for a supersonic airplane, it is preferred that a polyimide resin is used as a matrix resin. As a polyimide resin, a crystalline or amorphous resin can be used. Concretely, a crystalline polyimide using 4,4'-bis(3-aminophenoxy)diphenyl as a diamine and pyromellitic dianhydride as an acid anhydride, or an end-phthalic crystalline polyimide using 3,4'-oxydianiline as a diamine, 3,3',4,4'-biphenyltetracarboxylic dianhydride as an acid anhydride and a phthalic anhydride as an end terminating agent can be preferably employed.

In particular, a polyimide resin having a high-reaction group at its end is preferred, and more preferably, the reactive end group in the composition is a phenylethynyl group. Concretely, one using 3,3',4,4'-biphenyltetracarboxylic dianhydride as an aromatic diacid anhydride, 3,4'-oxydianiline and 1,3-bis(3-aminophenoxy) benzene as an aromatic diamine and 4-phenylethynyl phthalic anhydride as an acid anhydride is preferred. Or, one using 4,4'-oxydiphthalic anhydride as an acid anhydride, 3,4'-oxydianiline as an aromatic diamine and 4-(3-aminophenoxy)-4'-phenylethynyl benzophenone as an end terminating agent is preferred.

In a case where such a high-thermal resistance resin is used, as aforementioned, it is important to provide a sizing agent having a thermal resistance to carbon fibers in advance in order to obtain carbon fibers excellent in composite properties and processibility.

As another important property in a case where a composite material prepared by stacking prepregs is used as a structural material, there is compression strength after impact. This is because there is a phenomenon wherein a delamination between layers of a composite material occurs by an impact to a member due to falling of a tool, collision of hailstone or birds and if this is too excessive, it cannot be used as a structural material.

In order to increase the compression strength after impact to more extent, it is effective to make a high-toughness material exist near one or both surfaces of a prepreg and distribute the highly tough material between layers when prepregs are stacked. As such a highly tough material, for example, a thermoplastic resin such as one disclosed in JP-A-SHO 63-162732, an elastomer such as one disclosed in JP-A-HEI-4-268361 or an elastomer modified thermosetting resin such as one disclosed in U.S. Pat. No. 3,472,730 can be used. Because decrease of high-temperature properties is great if an elastomer or an elastomer modified thermosetting resin is used, use of a thermoplastic resin is preferred.

As the thermoplastic resin, a polyamide, a polyamideimide, a polyimide, a polyetherimide, a polysulfone and a polyethersulfone are preferred, and a polyamide, a polyamideimide and a polyimide are more preferred. Further, a polyamide excellent in toughness and bonding property with a matrix resin is particularly preferred, and one modified with an epoxy resin or a bismaleimide resin and a polyamide is more preferred. As the method for modification, semi-IPN is preferred.

As the formation of the above-described thermoplastic resin, formation of a film, particles or fibers can be employed.

In a case of film formation, because tack (adhesion property) of surface is lost if the surface of a prepreg is completely covered as disclosed in U.S. Pat. No. 4,604,319, it is preferred to maintain the tack of the surface by applying a method for providing through holes as disclosed in JP-A-SHO 63-97635, a method for forming as a porous material as disclosed in JP-A-HEI-5-138785 or a method for arranging tape-like films as disclosed in JP-A-HEI-5-287091.

In a case of particle formation, although any of spherical particles as shown in JP-A-HEI-1-110537, nonspherical particles as shown in JP-A-HEI-1-110536 and porous particles as shown in JP-A-HEI-5-1159 may be used, the size of the particle is preferred to be 30 $\mu$m or less in median diameter.

In a case of fiber formation, short fibers as shown in JPA-HEI-2-69566, long-fiber parallel arrangement as shown in JPA-HEI-4-292634, a woven fabric as shown in JP-A-HEI-2-32843, a nonwoven fabric as shown in WO94/16003 or a knit can be employed.

As the method for making a thermoplastic resin exist near a surface of a prepreg, a method for merely bonding or scattering a thermoplastic resin on one or both surfaces of a prepreg prepared by a regular process, or a method for bonding a film prepared by impregnating a matrix resin into a thermoplastic resin or a film prepared by dispersing a thermoplastic resin in a matrix resin onto one or both surfaces of a prepreg prepared by a regular process, can be employed.

With respect to the above-described formations, particle formation is more preferred in total consideration of process properties such as tack, a bonding property with a resin and mechanical properties originating therefrom. Further, it is also preferred to combine particles and fibers, particles and a film or a film and fibers and to make the respective characteristics indicate.

In order to increase the compression strength after impact, it is preferred that such a thermoplastic resin exists locally on the surface of a prepreg. Concretely, 90% or more of the thermoplastic resin preferably is present locally within a range from the surface of a prepreg to 15% of the thickness of the prepreg in its depth direction.

By combining such a thermoplastic resin and the aforementioned matrix resin, a prepreg having a higher open-hole compression strength under a hot-wet condition and a higher compression strength after impact under a room-temperature condition can be obtained.

Although the process for producing a prepreg is not particularly restricted, the conditions are preferably set so as to be suitable for carbon fibers and a matrix resin and so as to enable to increase mechanical properties of a composite material obtained by curing the prepreg.

As the content of carbon fibers in a prepreg, when it is represented by a volume fraction (Vf), the Vf is preferred to be controlled so as to realize 50 to 60% at a content of a composite material after curing, and more preferably in the range of 53 to 58%.

If the Vf of a composite material is less than 50%, the elastic modulus of the composite material becomes low, and the compression strength, open-hole compression strength and compression strength after impact are all decreased. Further, in a member requiring a stiffness, it becomes necessary to increase the thickness of the member and the weight thereof increases. Furthermore, there may be a case where the resin flow during curing is excessive and a member cannot be finished at a required design size. Where, the Vf is a mean content over the whole portions including inter-layers and intra-layers. On the contrary, if the Vf is more than 60%, the impact resistance becomes insufficient. Namely, in the case of an inter-layer toughening composite material, it is difficult to increase the mean Vf keeping the inter-layer thickness to maintain the impact resistance, because the Vf of intra-layers becomes very high and there may be a case where the mechanical properties decrease. At a position where the Vf is high, the probability of contact between single filaments increases, and there is a possibility that the tensile strength and the shear strength decrease because of debonding and stress concentration at the contact portions. Therefore, it is desired that the Vf of a cured composite material is preferably in the range of 50 to 60%, more preferably in the range of 53 to 58%, in consideration of the balance of properties such as open-hole compression strength, compression strength after impact and tensile strength.

With respect to Vf of a prepreg, because it is preferred to extract a small amount of a resin for discharging air during curing, the Vf of a prepreg is preferably set to be lower by about 2% relative to the Vf of a cured composite material. Therefore, the Vf of a prepreg is preferably in the range of 48 to 58%, more preferably in the range of 51 to 56%.

In a composite material using noncircular cross-section carbon fibers, there may be a case where portions are generated in which impregnation of a resin is difficult as compared with a case of a composite material using circular cross-section carbon fibers. This is because, in a case of a composite material using noncircular cross-section carbon fibers, a portion closed by being surrounded with plural carbon fibers is likely to be generated as compared with a composite material using circular cross-section carbon fibers. Therefore, if the Vf is more than 60%, there is a possibility that voids, which are not impregnated with a resin and which are called as "air spot", are generated. Such a condition is not preferred because the air spot becomes a starting point of a crack and a space for storing a absorbed water or solvent. The Vf is preferably controlled to be in the range of 50 to 60% in order to produce a composite material with no air spot. Further, to prevent air spot, it is preferred to use carbon fibers having substantially no twist.

Although the amount of voids in a carbon fiber-reinforced composite material is preferred to be as little as possible, it is difficult to make it zero perfectly. Preferably, the allowable limit of the amount of voids is 2% or less in a cured composite material. More preferably, the amount of voids is 1% or less in consideration of long-term performance. If the amount of voids in a cured composite material is more than 2%, the shear strength and the compression strength may be rapidly decreased. The amount of voids may be determined by calculation from the thickness or dissolution method due to acid except a method defined in ASTM or JIS.

The above-described Vf has a relationship with the amount of voids, and the amount of voids tends to increase as the Vf increases. Therefore, in a case of a higher Vf, it is preferred to contrive the process, for example, to increase a molding pressure, to control the weight of prepreg in the range of 150 to 190 g/m$^2$, that is, to control the thickness per one ply of a prepreg in the range of about 150 to 190 $\mu$m, or to cure with bag vacuum curing process.

The dispersion of fibers in a matrix resin is also an important factor affecting the open-hole compression strength and the compression strength after impact. If the dispersion is not uniform, because the Vf determined at a local position may be much greater than 60%, the open-hole compression strength or the compression strength after impact may be decreased. The nonuniformity of the Vf in a composite material is preferably 5% or less.

Where, the nonuniformity of Vf is determined by measuring Vf in a section with a square of 100×100 $\mu$m extracted freely from a portion which is present in a layer and has no interlayers, in a cross section of a cured composite material prepared by cutting the material in a direction perpendicular to a fiber direction, and the measurement is repeated at ten sections. The nonuniformity of Vf means a difference (Vmax−Vmin) between the maximum (Vmax: represented by %) and the minimum (Vmin: represented by %) in the measurement. More concretely, it is determined by counting the number of fibers in the section and calculating by multiplying the number by an area of a section of a single filament, or by measuring the area of fiber portions using an area meter and determining therefrom.

If the nonuniformity in Vf of a cured composite material is more than 5%, locally exists a resin-rich or fiber-rich portion, there exists a nonuniformity of properties corresponding to the nonuniformity of Vf in the composite material, and such a condition is not preferred. The nonuniformity of Vf is more preferably 3% or less.

The carbon fiber-reinforced composite material according to the present invention can be obtained by curing the prepreg according to the present invention. Although the curing condition is not particularly restricted, it is preferred to apply the above-described technology depending upon fibers and a resin.

Further, although it is preferred that the carbon fiber-reinforced composite material according to the present invention is produced by using only the prepregs according to the present invention, even in a mixture or hybrid structure with a prepreg which is not included in the present invention, a composite material having a high compression strength can be obtained. Concretely, for example, it is possible to effectively increase a compression or flexural strength by using a prepreg according to the present invention in a portion applied with a compression or flexural stress.

Moreover, the carbon fiber-reinforced composite material according to the present invention can be specified also by a characteristic wherein the composite material is reinforced by noncircular cross-section carbon fibers and has a ratio of a flexural elastic modulus under a hot-wet condition to a flexural elastic modulus under a room-temperature condition of 0.83 or more.

In the present invention, variation in the flexural elastic modulus of a carbon fiber-reinforced composite material due to temperature and humidity is preferred to be as small as possible. Namely, the deformation of a member due to temperature variation is smaller as the variation of the elastic modulus is smaller, and fatigue due to thermal deformation originating from temperature variation can be decreased by the above-described condition. However, in a case where the member according to the present invention is combined with another material, it is preferred that amounts of thermal deformation of both members are equal to each other. By this condition, a stress generated between both members can be decreased and unexpected breakage or damage can be prevented.

If the ratio of a flexural elastic modulus under a hot-wet condition to a flexural elastic modulus under a room-temperature condition is less than 0.83, deformation of a member comprising this composite material becomes great, and it is difficult to maintain the original form of the member itself. As a result, for example, in a case where the member is a wing of an aircraft, if the deformation becomes great, the aerodynamic property of the wing changes.

Although the elastic modulus of carbon fibers almost is not affected by a temperature of about 100° C., a matrix resin is strongly affected by the temperature. Namely, the reason of reduction of elastic modulus of a composite material under a high temperature is in reduction of elastic modulus of a matrix resin. Therefore, the elastic modulus in a direction perpendicular to a fiber direction, in which affection of reinforcing fibers is small, is more affected by a temperature. There is a shear elastic modulus in plane as a property of a resin other than the property in the direction perpendicular to the fiber direction, and this property is also likely to be affected by a temperature.

Further, the compression strength of a composite material is also affected by the elastic modulus of a matrix resin, and the compression strength decreases by reduction of the elastic modulus of the resin. Therefore, in order to increase the open-hole compression strength and the compression strength after impact, it is an important point to maintain the ratio of a flexural elastic modulus under a hot-wet condition to a flexural elastic modulus under a room-temperature condition in a condition of 0.83 or more. The ratio of the flexural elastic moduli is preferably not less than 0.85, more preferably not less than 0.87. The upper limit thereof is preferred as it is higher, and although 1.00 is ideal, in practice it is preferred to be 0.99 or less.

The retention of the open-hole compression strength under a hot-wet condition relative to the open-hole compression strength under a room-temperature condition is preferably not less than 80%, more preferably not less than 85%, and further more preferably not less than 90%.

Because, in a open-hole composite material, the reduction of strength due to opening of holes is greater than that in an isotropic metal material, the strength at the portions including holes becomes critical on design. If the reduction of strength in the open-hole portion is great, a member must be extremely thick, and whereby the member becomes heavy as well as becomes expensive. Moreover, if a connecting portion thereof becomes thicker, mechanical connection by rivets or bolts may be difficult.

By prepregs and carbon fiber-reinforced composite material according to the present invention described hereinabove, a carbon fiber-reinforced composite material having a high mechanical properties in compression, particularly high compression strength under a hot-wet condition and high compression strength after impact, and suitable as a structural material, can be provided.

EXAMPLES

Hereinafter, the present invention will be explained in more detail with reference to examples.

Firstly, methods for determining properties used in the present invention will be explained.

(1) Determination of compression shear strength:

The compression shear strength (CILS) is determined based on BMS8-276C. A unidirectional cured laminate having a $[0°]_{24}$ configuration is cut out to a rectangle with a width of 0.5 inch and a length of 3.15 inch, notches having a width of 0.85 inch are provided on both sides thereof, and the CILS is determined at a cross head speed of 1.0 mm/min.

(2) Determination of inter-laminar shear strength:

The inter-laminar shear strength (ILSS) is determined based on ASTM-D2344. A unidirectional cured laminate having a $[0°]_{12}$ configuration is cut out to a rectangle with a width of 6.4 mm, a length of 40 mm and a thickness of about 2 mm, the span length is set four times the thickness, and the ILSS is determined at a cross head speed of 1.3 mm/min.

(3) Determination of 90° tensile strength:

The 90° (direction perpendicular to fiber direction) tensile strength (90° TS) is determined based on ASTM-D3039M. A unidirectional cured laminate having a $[0°]_{12}$ configuration is cut out to a rectangle with a sample width of 25.0 mm and a length of 175.0 mm, and the 90° TS is determined at a cross head speed of 2.5 mm/min by tensile test.

(4) Fiber volume fraction:

The fiber volume fraction (Vf) of a sample is determined by calculation by the following equation.

Vf(%)=(weight of prepreg×number of stacking of prepregs×100)/ (density of fibers×thickness of sample of composite material)

(5) Void content:

The void volume rate of a sample is determined from the total area of voids in 1,000-times images of enlarged copies of photographs prepared by sampling freely selected ten sections of the sample and enlarging them by an optical microscope at a magnification of 500 times. In order to clarify the shapes of voids, the sections of the sample are sufficiently polished with a sand paper having a particle grade of #2,000, and thereafter further polished with aluminum oxide particles having a diameter of 0.05 μm until scratches disappear.

Example 1

20% dimethyl sulfoxyde solution of an acryl-based copolymer comprising acrylonitrile of 99.3 wt. % and itaconic acid of 0.7 wt. % (polymer with a solution viscosity of 600 poise at 45° C.) was discharged into the atmosphere using a spinneret shown in FIG. 6(A) and was passed into a coagulation bath through an air-gap of 3 mm, dry/wet spinning was carried out using a stationary coagulation bath containing 30% dimethyl sulfoxide and controlled at a temperature of 5° C. Swollen fibers were formed by washing and stretching in water baths.

Amino-modified silicone (amine content: 0.8%) was provided to the swollen fibers, stretching was performed continuously after drying, and they were wound after stretching at a total draw ratio of 10 times. The fibers were oxidized in an air having a temperature profile of 250/270° C., and then they were introduced into a carbonization furnace with a maximum temperature of 1,400° C. to be carbonized in a nitrogen atmosphere. The shape of the cross section of the carbon fibers obtained was one shown in FIG. 4(A). The Pmax, Pmin, degree of deformation D and surface flatness S are shown in Table 1.

Thereafter, the carbon fibers were treated at a total quantity of electricity of 60 coulomb/g by using an ammonium bicarbonate aqueous solution having a concentration of 0.25 mol/l as an electrolytic solution, controlling an applied quantity of electricity per one electrolysis bath at 20 coulomb/g·bath and repeating the treatment by three baths. At that time, the electrolytic solution discolored into black. Succeedingly the fibers were washed with water so that the pH of the surface of the fibers became 7.2, and they were then dried at 150° C.

In the noncircular cross-section carbon fibers thus obtained, the surface oxygen concentration O/C was 0.12, the surface nitrogen concentration N/C was 0.05, the strand strength was 5.78 GPa and the elastic modulus was 289 GPa.

(A) Preparation of resin composition:

A primary resin composition was prepared by kneading the following raw materials.

(1) prereactant of methylenebis-p-phenylenedimaleimide and bisphenol-A-dicyanate (1:9) (BT2160, produced by

| | | |
|---|---|---|
| (1) Mitsubishi Gas Chemical Corporation) | 80.0 | parts |
| (2) tetraglycidyldiaminodiphenylmethane (ELM434, produced by Sumitomo Chemical Industries, Inc.) | 20.0 | parts |
| (3) polyethersulfone (PES5003P, produced by Mitsui Toatsu Chemical Corporation) | 7.0 | parts |
| (4) dicumyl peroxide | 0.1 | part |
| (5) p-toluenesulfonic acid | 0.04 | part |

Further, a secondary resin composition was prepared by kneading the following raw materials.

| | | |
|---|---|---|
| (1) prereactant of methylenebis-p-phenyl-enedimaleimide and bisphenol-A-dicyanate (1:9) (BT2160, produced by Mitsubishi Gas Chemical Corporation) | 80.0 | parts |
| (2) tetraglycidyldiaminodiphenylmethane (ELM434, produced by Sumitomo Chemical Industries, Inc.) | 20.0 | parts |
| (3) polyethersulfone (PES5003P, produced by Mitsui Toatsu Chemical Corporation) | 5.0 | parts |
| (4) dicumyl peroxide | 0.1 | part |
| (5) p-toluenesulfonic acid | 0.04 | part |
| (6) epoxy-modified nylon particles | 35.5 | parts |

As the epoxy-modified nylon resin (6) among the raw materials of the secondary resin composition, a resin shown in example 1 of JP-A-HEI-1-104624 was used.

(B) Preparation of prepreg:

The primary resin composition prepared in the above-described (A) was applied on a release coated paper at an application amount of 31.2 g/m² using a reverse roll coater to form a resin film. Then, the secondary resin composition was applied thereon at an application amount of 20.5 g/m² to form a resin film. The flexural elastic modulus under a room-temperature condition, flexural elastic modulus under a hot-wet condition and water absorption of the resin obtained after curing are as follows.

| | | |
|---|---|---|
| flexural elastic modulus under a room-temperature condition | 3.73 | GPa |
| flexural elastic modulus under a hot-wet condition | 2.83 | GPa |
| water absorption | 1.84% | |

The noncircular cross-section carbon fibers arranged unidirectionally were nipped from both sides with the above-described primary resin films, a resin was impregnated thereinto by heating and pressing, and further, the secondary resin films were bonded onto both sides thereof to prepare a prepreg having a weight of prepreg of 293.4 g/m², a weight of carbon fibers of 190.0 g/m² and a carbon fiber weight content of 64.8%.

(C) Production of cured laminate:

The prepregs prepared in the above-described (B) were stacked at a configuration depending upon determination items of properties, and the laminate stacked with prepregs was cured in an autoclave at a temperature of 180° C and a gauge pressure of 0.6 MPa for 2 hours.

(D) Determination of open-hole compression strength and compression strength after impact:

The open-hole compression strength "OHC" (under a room-temperature condition [RT] and a hot-wet condition [H/W]) and the compression strength after impact "CAI" of the laminate produced in the above-described (C) were determined, and the following results were indicated.

| | | |
|---|---|---|
| compression strength under a room-temperature condition | 348 | MPa |
| compression strength under a hot-wet condition | 314 | MPa |
| compression strength after impact | 308 | MPa |

The data obtained by determining the compression shear strength, inter-laminar shear strength, 90° tensile strength and flexural elastic moduli under a room-temperature condition and a hot-wet condition of the stacked laminate produced in the above-described (C), the Vf and void content thereof, and the water absorption obtained in the compression test under a hot-wet condition of the above-described (D), are shown in Table 1.

Further, the linear expansion coefficient of the composite material was 33×10⁻⁶/K. The linear expansion coefficient was determined at a temperature elevation speed of 2.0° C./min. in a range from 25° C. to 100° C. using a TMA apparatus (produced by T.A. Instruments Corporation).

Example 2

Figure 5A:
FIGS. 5(A)–(F) are schematic views showing cross-sectional shapes of spinneret for spinning carbon fibers shown in FIGS. 1(A)–(F).
Figure 5B:
Figure 5C:
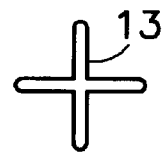
Figure 5D:
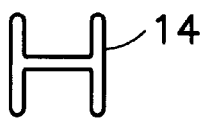

Carbon fibers were obtained in a manner similar to that of Example 1 other than a condition using a spinneret shown in FIG. 5(B). As the shape of the cross section of carbon fibers in this Example, one shown in FIG. 1(B) was obtained. The Pmax, Pmin, degree of deformation D and surface flatness S are shown in Table 1. In the noncircular cross-section carbon fibers thus obtained, the surface oxygen concentration O/C was 0.11, the surface nitrogen concentration N/C was 0.05, the strand strength was 5.68 GPa and the elastic modulus was 288 GPa. The obtained cured laminate was processed into an open-hole specimen in the same manner as that of Example 1, and the compression strength under a room-temperature condition, the compression strength under a hot-wet condition and the compression strength after impact thereof were determined. The results are as follows. Further, other properties are shown in Table 1.

| | | |
|---|---|---|
| compression strength under a room-temperature condition | 321 | MPa |
| compression strength under a hot-wet condition | 292 | MPa |
| compression strength after impact | 307 | MPa |

Example 3

Figure 5E:
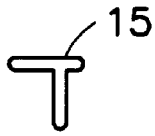
Figure 5F:
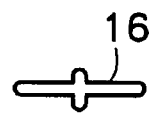

Carbon fibers were obtained in a manner similar to that of Example 1 other than a condition using a spinneret shown in FIG. 5(F). As the shape of the cross section of carbon fibers in this Example, one shown in FIG. 1(F) was obtained. The Pmax, Pmin, degree of deformation D and surface flatness S are shown in Table 1. In the noncircular cross-section carbon fibers thus obtained, the surface oxygen concentration O/C was 0.12, the surface nitrogen concentration N/C was 0.05, the strand strength was 5.68 GPa and the elastic modulus was 289 GPa. The obtained cured laminate was processed into an open-hole specimen in the same manner as that of Example 1, and the compression strength under a room-temperature condition, the compression strength under a hot-wet condition and the compression strength after impact thereof were determined. The results are as follows. Further, other properties are shown in Table 1.

| | | |
|---|---|---|
| compression strength under a room-temperature condition | 321 | MPa |
| compression strength under a hot-wet condition | 289 | MPa |
| compression strength after impact | 304 | MPa |

Example 4

Carbon fibers were obtained in a manner similar to that of Example 1 other than a condition using a spinneret shown in FIG. 5(E). As the shape of the cross section of carbon fibers in this Example, one shown in FIG. 1(E) was obtained. The Pmax, Pmin, degree of deformation D and surface flatness S are shown in Table 1. In the noncircular cross-section carbon fibers thus obtained, the surface oxygen concentration O/C was 0.13, the surface nitrogen concentration N/C was 0.05, the strand strength was 5.59 GPa and the elastic modulus was 289 GPa. The obtained cured laminate was processed into an open-hole specimen in the same manner as that of Example 1, and the compression strength under a room-temperature condition, the compression strength under a hot-wet condition and the compression strength after impact thereof were determined. The results are as follows. Further, other properties are shown in Table 1.

| | | |
|---|---|---|
| compression strength under a room-temperature condition | 332 | MPa |
| compression strength under a hot-wet condition | 301 | MPa |
| compression strength after impact | 307 | MPa |

Example 5

Carbon fibers and a cured laminate were obtained in a manner similar to that of Example 1 other than a condition using a spinneret which has circular cross-section holes. The shape of the cross section of carbon fibers in this Example was circular. In the circular cross-section carbon fibers thus obtained, the surface oxygen concentration O/C was 0.13, the surface nitrogen concentration N/C was 0.05, the strand strength was 5.78 GPa and the elastic modulus was 289 GPa. The obtained cured laminate was processed into an open-hole specimen as that of Example 1, and the compression strength under a room-temperature condition, the compression strength under a hot-wet condition and the compression strength after impact thereof were determined. The results are as follows. Further, other properties are shown in Table 1.

| | | |
|---|---|---|
| compression strength under a room-temperature condition | 301 | MPa |
| compression strength under a hot-wet condition | 277 | MPa |
| compression strength after impact | 279 | MPa |

Example 6

Carbon fibers and a cured laminate were obtained in a manner similar to that of Example 1 other than a condition where the carbon fibers were treated at a total quantity of electricity of 80 coulomb/g by controlling an applied quantity of electricity per one electrolysis bath at 20 coulomb/g·bath and repeating the treatment by four baths. In the noncircular cross-section carbon fibers thus obtained, the surface oxygen concentration O/C was 0.14, the surface nitrogen concentration N/C was 0.07 and the pH of the carbon fiber surface was 7.4. The obtained cured laminate was processed into open-hole specimens in the same manner as that of Example 1, and the compression strength under a room-temperature condition, the compression strength under a hot-wet condition and the compression strength after impact thereof were determined. The results are as follows. Further, other properties are shown in Table 1.

| | | |
|---|---|---|
| compression strength under a room-temperature condition | 357 | MPa |
| compression strength under a hot-wet condition | 324 | MPa |
| compression strength after impact | 316 | MPa |

Example 7

Carbon fibers and a cured laminate were obtained in a manner similar to that of Example 1 other than a condition where the carbon fibers were treated at a total quantity of electricity of 40 coulomb/g by controlling an applied quantity of electricity per one electrolysis bath at 20 coulomb/g·bath and repeating the treatment by two baths. In the noncircular cross-section carbon fibers thus obtained, the surface oxygen concentration O/C was 0.10, the surface nitrogen concentration N/C was 0.04 and the pH of the carbon fiber surface was 7.0. The obtained cured laminate was processed into open-hole specimens in the same manner as that of Example 1, and the compression strength under a room-temperature condition, the compression strength under a hot-wet condition and the compression strength after impact thereof were determined. The results are as follows. Further, other properties are shown in Table 1.

| | | |
|---|---|---|
| compression strength under a room-temperature condition | 348 | MPa |
| compression strength under a hot-wet condition | 311 | MPa |
| compression strength after impact | 302 | MPa |

Example 8

Carbon fibers and a cured laminate were obtained in a manner similar to that of Example 1 other than a condition where the carbon fibers were treated at a quantity of electricity of 10 coulomb/g using a sulfuric acid aqueous solution having a concentration of 0.10 mol/l as an electrolytic solution. In the noncircular cross-section carbon fibers thus obtained, the surface oxygen concentration O/C was 0.16, the surface nitrogen concentration N/C was 0.01 and the pH of the carbon fiber surface was 5.6. The obtained cured laminate was processed into open-hole specimens in the same manner as that of Example 1, and the compression strength under a room-temperature condition, the compression strength under a hot-wet condition and the compression strength after impact thereof were determined. The results are as follows. Further, other properties are shown in Table 1.

| | | |
|---|---|---|
| compression strength under a room-temperature condition | 330 | MPa |
| compression strength under a hot-wet condition | 299 | MPa |
| compression strength after impact | 277 | MPa |

Example 9

A cured laminate was obtained in a manner similar to that of Example 1 other than a condition where a prepreg having a weight of prepreg of 323.4 g/m$^2$, a weight of carbon fibers of 220.0 g/m$^2$ and a carbon fiber weight content of 68.0% was prepared. The obtained cured laminate was processed into open-hole specimens in the same manner as that of Example 1, and the compression strength under a room-temperature condition, the compression strength under a hot-wet condition and the compression strength after impact thereof were determined. The results are as follows. Further, other properties are shown in Table 1.

| | | |
|---|---|---|
| compression strength under a room-temperature condition | 378 | MPa |
| compression strength under a hot-wet condition | 317 | MPa |
| compression strength after impact | 304 | MPa |

Example 10

A cured laminate was obtained in a manner similar to that of Example 1 other than a condition where a prepreg having a weight of prepreg of 263.4 g/m$^2$, a weight of carbon fibers of 160.0 g/m$^2$ and a carbon fiber weight content of 60.7% was prepared. The obtained cured laminate was processed into open-hole specimens in the same manner as that of Example 1, and the compression strength under a room-temperature condition, the compression strength under a hot-wet condition and the compression strength after impact thereof were determined. The results are as follows. Further, other properties are shown in Table 1.

| | | |
|---|---|---|
| compression strength under a room-temperature condition | 377 | MPa |
| compression strength under a hot-wet condition | 280 | MPa |
| compression strength after impact | 305 | MPa |

Comparative Example 1

Carbon fibers and a cured laminate were obtained in a manner similar to that of Example 1 other than a condition where a spinneret having circular cross-section discharge holes was used and the carbon fibers were treated at a quantity of electricity of 10 coulomb/g using a sulfuric acid aqueous solution having a concentration of 0.10 mol/l as an electrolytic solution. The obtained cured laminate was processed into open-hole specimens in the same manner as that of Example 1, and the compression strength under a room-temperature condition, the compression strength under a hot-wet condition and the compression strength after impact thereof were determined. The results are as follows. Further, other properties are shown in Table 1.

| | | |
|---|---|---|
| compression strength under a room-temperature condition | 302 | MPa |
| compression strength under a hot-wet condition | 265 | MPa |
| compression strength after impact | 250 | MPa |

Example 11

20% dimethyl sulfoxide solution of an acryl-based copolymer comprising acrylonitrile of 99.3 wt. % and itaconic acid of 0.7 wt. % (polymer with a solution viscosity of 600 poise at 45° C.) was discharged into atmosphere using a spinneret shown in FIG. 6(A), and was passed into coagulation bath through an air-gap of 3 mm. Thus, dry/wet spinning was carried out using a stationary coagulation bath containing 30% dimethyl sulfoxide and controlled at a temperature of 5° C. Swollen fibers were formed by washing and stretching in water baths.

Amino-modified silicone (amine content: 0.8%) was provided to the swollen fibers, stretching was performed continuously after drying, and they were wound after stretching at a total draw ratio of 10 times. The fibers were oxidized in air having a temperature profile of 250/270° C., and then they were introduced into a carbonization furnace with a maximum temperature of 1,400° C. to be carbonized in a nitrogen atmosphere. As the shape of the cross section of the carbon fibers obtained, one shown in FIG. 4(A) was indicated. The Pmax, Pmin, degree of deformation D and surface flatness S are shown in Table 2.

Thereafter, the carbon fibers were treated at a total quantity of electricity of 60 coulomb/g by using an ammonium bicarbonate aqueous solution having a concentration of 0.25 mol/l as an electrolytic solution, controlling an applied quantity of electricity per one electrolysis bath at 20 coulomb/g·bath and repeating the treatment by three baths. At that time, the electrolytic solution discolored into black. Succeedingly the fibers were washed by water so that the pH of the carbon fiber surface became 7.2, and they were then dried at 150° C.

In the noncircular cross-section carbon fibers thus obtained, the surface oxygen concentration O/C was 0.12, the surface nitrogen concentration N/C was 0.05, the surface hydroxylic concentration C—OH/C was 0.6%, the surface carboxylic concentration COOH/C was 1.0%, the strand strength was 5.78 GPa and the elastic modulus was 289 GPa.
(A) Preparation of resin composition:

A primary resin composition was prepared by kneading the following raw materials.

| | |
|---|---|
| (1) tetraglycidyldiaminodiphenylmethane (ELM434, produced by Sumitomo Chemical Industries, Inc.) | 90.0 parts |
| (2) bisphenol F epoxy resin ("Epicron" 830, produced by Dainihon Ink Corporation) | 10.0 parts |
| (3) polyethersulfone (PES5003P, produced by Mitsui Toatsu Chemical Corporation) | 12.7 parts |
| (4) 3,3'-diaminodiphenylsulfone (produced by Wakayama Seika Corporation) | 35.0 parts |

Further, a secondary resin composition was prepared by kneading the following raw materials.

| | |
|---|---|
| (1) tetraglycidyldiaminodiphenylmethane (ELM434, produced by Sumitomo Chemical Industries, Inc.) | 90.0 parts |
| (2) bisphenol F epoxy resin ("Epicron" 830, produced by Dainihon Ink Corporation) | 10.0 parts |
| (3) polyethersulfone (PES5003P, produced by Mitsui Toatsu Chemical Corporation) | 4.3 parts |
| (4) 3,3'-diaminodiphenylsulfone (produced by Wakayama Seika Corporation) | 35.0 parts |
| (5) epoxy-modified nylon particles | 35.2 parts |

As the epoxy-modified nylon resin (5) among the raw materials of the secondary resin composition, a resin shown in JP-A-HEI-1-104624 was used.
(B) Preparation of prepreg:

The primary resin composition prepared in the above-described (A) was applied on a release coated paper at an application amount of 31.2 g/m² using a reverse roll coater to form a resin film. Then, the secondary resin composition was applied thereon at an application amount of 20.5 g/m² to form a resin film. The flexural elastic modulus under a room-temperature condition, flexural elastic modulus under a hot-wet condition and water absorption of the resin obtained after curing are as follows.

| | |
|---|---|
| flexural elastic modulus under a room-temperature condition | 3.92 GPa |
| flexural elastic modulus under a hot-wet condition | 2.71 GPa |
| water absorption | 2.73% |

The noncircular cross-section carbon fibers arranged unidirectionally were nipped from both sides by the above-described primary resin films, a resin was impregnated thereinto by heating and pressing, and further, the secondary resin films were bonded onto both sides thereof to prepare a prepreg having a weight of prepreg of 293.4 g/m², a weight of carbon fibers of 190.0 g/m² and a carbon fiber weight content of 64.8%.
(C) Production of cured laminate:

The prepregs prepared in the above-described (B) were stacked at a configuration depending upon determination items of properties, and the laminate stacked with prepregs was cured in an autoclave at a temperature of 180° C. and a gauge pressure of 0.6 MPa for 2 hours.
(D) Determination of open-hole compression strength and compression strength after impact:

The open-hole compression strength (under a room-temperature condition and a hot-wet condition) and the compression strength after impact of the stacked laminate produced in the above-described (C) were determined, and the following results were indicated.

| | |
|---|---|
| compression strength under a room-temperature condition | 362 MPa |
| compression strength under a hot-wet condition | 310 MPa |
| compression strength after impact | 317 MPa |

(E) Determination of other FRP properties:

The data obtained by determining the compression shear strength, inter-laminar shear strength, 90° tensile strength and flexural elastic moduli under a room-temperature condition and a hot-wet condition of the stacked laminate produced in the above-described (C), the Vf and void content thereof, and the water absorption obtained in the compression test under a hot-wet condition of the above-described (D), are shown in Table 2.

Example 12

Carbon fibers were obtained in a manner similar to that of Example 11 other than a condition using a spinneret shown in FIG. 5(B). As the shape of the cross section of carbon fibers in this Example, one shown in FIG. 1(B) was obtained. The Pmax, Pmin, degree of deformation D and surface flatness S are shown in Table 2. The obtained cured laminate was processed into open-hole specimens in the same manner as that of Example 11, and the compression strength under a room-temperature condition, the compression strength under a hot-wet condition and the compression strength after impact thereof were determined. The results are as follows. Further, other properties are shown in Table 2.

| | |
|---|---|
| compression strength under a room-temperature condition | 335 MPa |
| compression strength under a hot-wet condition | 289 MPa |
| compression strength after impact | 317 MPa |

Example 13

Carbon fibers were obtained in a manner similar to that of Example 11 other than a condition using a spinneret shown in FIG. 5(F). As the shape of the cross section of carbon fibers in this Example, one shown in FIG. 1(F) was obtained. The Pmax, Pmin, degree of deformation D and surface flatness S are shown in Table 2. The obtained cured laminate was processed into open-hole specimens in the same manner as that of Example 11, and the compression strength under a room-temperature condition, the compression strength under a hot-wet condition and the compression strength after impact thereof were determined. The results are as follows. Further, other properties are shown in Table 2.

| | |
|---|---|
| compression strength under a room-temperature condition | 333 MPa |
| compression strength under a hot-wet condition | 284 MPa |
| compression strength after impact | 313 MPa |

Example 14

A cured laminate was obtained in a manner similar to that of Example 11 other than a condition where carbon fibers having a pH of the carbon fiber surface of 5.8 were obtained by dipping the carbon fibers prepared in a manner similar to that of Example 11 in a sulfuric acid aqueous solution having a concentration of 1.0 mol/l for ten minutes, washing by water and drying at 120° C. The obtained cured laminate was processed into open-hole specimens in the same manner as that of Example 11, and the compression strength under a room-temperature condition, the compression strength under a hot-wet condition and the compression strength after impact thereof were determined. The results are as follows. Further, other properties are shown in Table 2.

| | |
|---|---|
| compression strength under a room-temperature condition | 344 MPa |
| compression strength under a hot-wet condition | 300 MPa |
| compression strength after impact | 297 MPa |

Example 15

Carbon fibers and a cured laminate were obtained in a manner similar to that of Example 11 other than a condition where the carbon fibers were treated at a quantity of electricity of 10 coulomb/g using a sulfuric acid aqueous solution having a concentration of 0.10 mol/l as an electrolytic solution. In the noncircular cross-section carbon fibers thus obtained, the surface oxygen concentration O/C was 0.16, the surface nitrogen concentration N/C was 0.01 and the pH of the carbon fiber surface was 5.6. The obtained cured laminate was processed into open-hole specimens in the same manner as that of Example 11, and the compression strength under a room-temperature condition, the compression strength under a hot-wet condition and the compression strength after impact thereof were determined. The results are as follows. Further, other properties are shown in Table 2.

| | |
|---|---|
| compression strength under a room-temperature condition | 344 MPa |
| compression strength under a hot-wet condition | 296 MPa |
| compression strength after impact | 288 MPa |

Comparative Example 2

Carbon fibers and a cured laminate were obtained in a manner similar to that of Example 11 other than a condition where a spinneret having circular cross-section discharge holes was used and the carbon fibers were treated at a quantity of electricity of 10 coulomb/g using a sulfuric acid aqueous solution having a concentration of 0.10 mol/l as an electrolytic solution. The obtained cured laminate was processed into open-hole specimens in the same manner as that of Example 11, and the compression strength under a room-temperature condition, the compression strength under a hot-wet condition and the compression strength after impact thereof were determined. The results are as follows. Further, other properties are shown in Table 2.

| | |
|---|---|
| compression strength under a room-temperature condition | 317 MPa |
| compression strength under a hot-wet condition | 270 MPa |
| compression strength after impact | 261 MPa |

Example 16

A cured laminate was obtained in a manner similar to that of Example 11 other than a condition where a secondary resin composition was prepared by kneading the following raw materials.

| | |
|---|---|
| (1) tetraglycidyldiaminodiphenylmethane (ELM434, produced by Sumitomo Chemical Industries, Inc.) | 90.0 parts |
| (2) bisphenol F epoxy resin ("Epicron" 830, produced by Dainihon Ink Corporation) | 10.0 parts |
| (3) polyethersulfone (PES5003P, produced by Mitsui Toatsu Chemical Corporation) | 4.3 parts |
| (4) 4,4'-diaminodiphenylsulfone (produced by Wakayama Seika Corporation) | 35.0 parts |
| (5) fine particles-glylamide (particle diameter: not more than 30 μm) | 35.2 parts |

As the fine particles-glylamide (5) among the raw materials of the secondary resin composition, a resin shown in JP-A-SHO 63-162732 was used. The flexural elastic modulus under a room-temperature condition, flexural elastic modulus under a hot-wet condition and water absorption of the resin obtained after curing are as follows.

| | |
|---|---|
| flexural elastic modulus under a room-temperature condition | 3.82 GPa |
| flexural elastic modulus under a hot-wet condition | 2.71 GPa |
| water absorption | 2.95% |

The obtained cured laminate was processed into open-hole specimens in the same manner as that of Example 11, and the compression strength under a room-temperature condition, the compression strength under a hot-wet condition and the compression strength after impact thereof were determined. The results are as follows. Further, other properties are shown in Table 3.

| | |
|---|---|
| compression strength under a room-temperature condition | 346 MPa |
| compression strength under a hot-wet condition | 298 MPa |
| compression strength after impact | 297 MPa |

Example 17

Carbon fibers and a cured laminate were obtained in a manner similar to that of Example 16 other than a condition using a spinneret shown in FIG. 5(B). As the shape of the cross section of carbon fibers in this Example, one shown in FIG. 1(B) was obtained. The Pmax, Pmin, degree of deformation D and surface flatness S are shown in Table 3. The resulted data of determination of the compression strength under a room-temperature condition, the compression strength under a hot-wet condition and the compression strength after impact are as follows. Further, other properties are shown in Table 3.

| | |
|---|---|
| compression strength under a room-temperature condition | 318 MPa |
| compression strength under a hot-wet condition | 277 MPa |
| compression strength after impact | 297 MPa |

Example 18

Carbon fibers and a cured laminate were obtained in a manner similar to that of Example 16 other than a condition using a spinneret shown in FIG. 5(F). As the shape of the cross section of carbon fibers in this Example, one shown in FIG. 1(F) was obtained. The Pmax, Pmin, degree of deformation D and surface flatness S are shown in Table 3. The resulted data of determination of the compression strength under a room-temperature condition, the compression strength under a hot-wet condition and the compression strength after-impact are as follows. Further, other properties are shown in Table 3.

| | |
|---|---|
| compression strength under a room-temperature condition | 317 MPa |
| compression strength under a hot-wet condition | 276 MPa |
| compression strength after impact | 293 MPa |

Example 19

Carbon fibers and a cured laminate were obtained in a manner similar to that of Example 16 other than a condition where the carbon fibers were treated at a quantity of electricity of 10 coulomb/g using a sulfuric acid aqueous solution having a concentration of 0.10 mol/l as an electrolytic solution. In the noncircular cross-section carbon fibers thus obtained, the surface oxygen concentration O/C was 0.16, the surface nitrogen concentration N/C was 0.01 and the pH of the surface of the fibers was 5.6. The resulted data of determination of the compression strength under a room-temperature condition, the compression strength under a hot-wet condition and the compression strength after impact are as follows. Further, other properties are shown in Table 3.

| | |
|---|---|
| compression strength under a room-temperature condition | 326 MPa |
| compression strength under a hot-wet condition | 282 MPa |
| compression strength after impact | 276 MPa |

Comparative Example 3

Carbon fibers and a cured laminate were obtained in a manner similar to that of Example 16 other than a condition where a spinneret having circular cross-section discharge holes was used and the carbon fibers were treated at a quantity of electricity of 10 coulomb/g using a sulfuric acid aqueous solution having a concentration of 0.10 mol/l as an electrolytic solution. The obtained cured laminate was processed into openhole specimens in the same manner as that of Example 16, and the compression strength under a room-temperature condition, the compression strength under a hot-wet condition and the compression strength after impact thereof were determined. The results are as follows. Further, other properties are shown in Table 3.

| | |
|---|---|
| compression strength under a room-temperature condition | 305 MPa |
| compression strength under a hot-wet condition | 264 MPa |
| compression strength after impact | 242 MPa |

Comparative Example 4

Carbon fibers were obtained in a manner similar to that of Example 11 other than a condition where the carbon fibers were treated at a total quantity of electricity of 100 coulomb/g by using a sulfuric acid aqueous solution having a concentration 0.10 mol/l as an electrolytic solution, controlling an applied quantity of electricity per one electrolysis bath at 20 coulomb/g·bath and repeating the treatment by five baths. In the noncircular cross-section carbon fibers thus obtained, the surface oxygen concentration O/C was 0.21, the surface nitrogen concentration N/C was 0.01 and the pH of the carbon fiber surface was 5.4.

(A) Preparation of resin composition:

A primary resin composition was prepared by kneading the following raw materials.

| | |
|---|---|
| (1) tetraglycidyldiaminodiphenylmethane (epoxy equivalency: 120), (ELM434, produced by Sumitomo Chemical Industries, Inc.) | 90.0 parts |
| (2) bisphenol F epoxy resin (epoxy equivalency: 172), ("Epicron" 830, produced by Dainihon Ink Corporation) | 20.0 parts |
| (3) polyethersulfone (PES5003P, produced by Mitsui Toatsu Chemical Corporation) | 12.7 parts |
| (4) 4,4'-diaminodiphenylsulfone ("Sumicure" S, produced by Sumitomo Chemical Industries, Inc.) | 35.0 parts |

In this composition, the mole number of 4,4'-diaminodiphenylsulfone is 0.175 time the mole number of epoxy group.

A secondary resin composition was prepared by kneading the following raw materials.

| | |
|---|---|
| (1) tetraglycidyldiaminodiphenylmethane (ELM434, produced by Sumitomo Chemical Industries, Inc.) | 90.0 parts |
| (2) bisphenol F epoxy resin ("Epicron" 830, produced by Dainihon Ink Corporation) | 10.0 parts |
| (3) polyethersulfone (PES5003P, produced by Mitsui | 4.3 parts |

-continued

| | |
|---|---|
| Toatsu Chemical Corporation) | |
| (4) 4,4'-diaminodiphenylsulfone (produced by Wakayama Seika Corporation) | 35.0 parts |
| (5) fine particles-glylamide (particle diameter: not more than 30 μm) | 35.2 parts |

As the fine particles-glylamide (5) among the raw materials of the secondary resin composition, a resin shown in JP-A-SHO 63-162732 was used.

(B) Preparation of prepreg:

The primary resin composition prepared in the above-described (A) was applied on a release coated paper at an application amount of 31.2 g/m² using a reverse roll coater to form a resin film. Then, the secondary resin composition was applied thereon at an application amount of 20.5 g/m² to form a resin film. The flexural elastic modulus under a room-temperature condition, flexural elastic modulus under a hot-wet condition and water absorption of the resin obtained after curing are as follows.

| | |
|---|---|
| flexural elastic modulus under a room-temperature condition | 3.40 GPa |
| flexural elastic modulus under a hot-wet condition | 2.35 GPa |
| water absorption | 3.50% |

The noncircular cross-section carbon fibers arranged unidirectionally were nipped from both sides by the above-described primary resin films, a resin was impregnated thereinto by heating and pressing, and further, the secondary resin films were bonded onto both sides thereof to prepare a prepreg having a weight of prepreg of 293.4 g/m², a weight of carbon fibers of 190.0 g/m² and a carbon fiber weight content of 64.8%.

(C) Production of cured laminate:

The prepregs prepared in the above-described (B) were stacked at a structure depending upon determination items of properties, and the laminate stacked with prepregs was cured in an autoclave at a temperature of 180° C. and a gauge pressure of 0 MPa for 2 hours.

(D) Determination of open-hole compression strength and compression strength after impact:

The open-hole compression strength (under a room-temperature condition and a hot-wet condition) and the compression strength after impact of the stacked laminate produced in the above-described (C) were determined, and the following results were indicated.

| | |
|---|---|
| compression strength under a room-temperature condition | 279 MPa |
| compression strength under a hot-wet condition | 235 MPa |
| compression strength after impact | 262 MPa |

(E) Determination of other FRP properties:

The data obtained by determining the compression shear strength, inter-laminar shear strength, 90° tensile strength and flexural elastic moduli under a room-temperature condition and a hot-wet condition of the stacked laminate produced in the above-described (C), the Vf and void content thereof, and the water absorption obtained in the compression test under a hot-wet condition of the above-described (D), are shown in Table 4.

Example 20

(A) Preparation of matrix resin:

3,4'-oxydianiline (7.0 kg), 1,3-bis(3-aminophenoxy)benzen (1.80 kg) and N-methyl-2-pyrrolidone (NMP, 9.0 kg) were introduced into a reactor equipped with a stirrer, a reflux condenser and a nitrogen introducing tube, and stirred under a condition of nitrogen atmosphere. A slurry prepared by adding 3,3',4,4'-biphenyltetracarboxylic dianhydride (13.2 kg) and 4-phenylethynyl phthalic anhydride (1.83 kg) to NMP (14.8 kg) was added to this solution, and it was stirred under a condition of nitrogen atmosphere for 24 hours to obtain a polyamic NMP solution having a solid component of 50%.

(B) Preparation of prepreg:

The polyamic NMP solution prepared in the above-described (A) was applied on a release coated paper using a knife coater. The application amount was 104 g/m².

The noncircular-section carbon fibers arranged unidirectionally were nipped from both sides by the above-described resin films, a resin was impregnated thereinto by heating and pressing to prepare a prepreg. In the prepreg obtained, a weight per unit area of carbon fibers of 190 g/m² and a carbon fiber weight content was 64.6%.

(C) Production of cured laminate:

The prepregs prepared in the above-described (B) were stacked at a configuration depending upon determination items of properties, and the laminate stacked with prepregs was treated in an autoclave at a temperature of 250° C. for one hour in order to remove the NMP and dehydrate therefrom, and succeedingly, cured at a temperature of 317° C. and a gauge pressure of 1.4 MPa for one hour.

(D) Determination of open-hole compression strength and compression strength after impact:

The open-hole compression strength (under a room-temperature condition and a hot-wet condition) and the compression strength after impact of the stacked laminate produced in the above-described (C) were determined, and the following results were indicated.

| | |
|---|---|
| compression strength under a room-temperature condition | 380 MPa |
| compression strength under a hot-wet condition | 277 MPa |
| compression strength after impact | 276 MPa |

TABLE 1

| | | Modification degree | | | | Properties of fiber | | |
|---|---|---|---|---|---|---|---|---|
| | Section | Pmin | Pmax | D | S | pH | O/C | N/C |
| Example 1 | three leaves | 0.094 | 0.094 | 2.6 | 1.10 | 7.2 | 0.12 | 0.05 |
| Example 2 | Δ | 0.086 | 0.086 | 1.4 | 1.11 | 7.2 | 0.11 | 0.05 |
| Example 3 | ellipse | 0.044 | 0.143 | 1.8 | 1.08 | 7.2 | 0.12 | 0.05 |
| Example 4 | noncircle | 0.073 | 0.192 | 2.5 | 1.08 | 7.2 | 0.13 | 0.05 |
| Example 5 | ◯ | 0.080 | 0.080 | 1.0 | 1.09 | 7.3 | 0.13 | 0.05 |

TABLE 1-continued

| | Section | Pmin | Pmax | D | S | pH | O/C | N/C |
|---|---|---|---|---|---|---|---|---|
| Example 6 | three leaves | 0.094 | 0.094 | 2.6 | 1.10 | 7.4 | 0.14 | 0.07 |
| Example 7 | three leaves | 0.094 | 0.094 | 2.6 | 1.10 | 7.0 | 0.10 | 0.04 |
| Example 8 | three leaves | 0.094 | 0.094 | 2.6 | 1.10 | 5.6 | 0.16 | 0.01 |
| Example 9 | three leaves | 0.094 | 0.094 | 2.6 | 1.10 | 7.2 | 0.12 | 0.05 |
| Example 10 | three leaves | 0.094 | 0.094 | 2.6 | 1.10 | 7.2 | 0.12 | 0.05 |
| Comparative Example 1 | ○ | 0.080 | 0.080 | 1.0 | 1.09 | 5.6 | 0.15 | 0.01 |

| | Properties of composite material | | | | | | | | | | | |
|---|---|---|---|---|---|---|---|---|---|---|---|---|
| | OHC | | | | | | Flexural elastic modulus | | | Water | OHC | | Void |
| | RT MPa | H/W MPa | CAI MPa | CILS MPa | ILSS MPa | 90° TS MPa | RT MPa | H/W MPa | Ratio | absorption % | retention % | Vf % | content % |
| Example 1 | 348 | 314 | 308 | 82.8 | 90.4 | 82.8 | 135 | 115 | 0.85 | 0.74 | 89 | 55.8 | 0.5 |
| Example 2 | 321 | 292 | 307 | 75.9 | 82.8 | 77.3 | 135 | 116 | 0.86 | 0.75 | 91 | 55.9 | 0.5 |
| Example 3 | 321 | 289 | 304 | 75.2 | 81.4 | 77.3 | 137 | 116 | 0.87 | 0.75 | 90 | 56.0 | 0.4 |
| Example 4 | 332 | 301 | 307 | 78.3 | 86.7 | 80.0 | 135 | 114 | 0.85 | 0.75 | 91 | 56.0 | 0.4 |
| Example 5 | 301 | 277 | 279 | 70.4 | 73.8 | 75.9 | 134 | 112 | 0.84 | 0.74 | 91 | 56.0 | 0.1 |
| Example 6 | 357 | 324 | 316 | 83.5 | 90.4 | 84.9 | 136 | 115 | 0.85 | 0.74 | 91 | 55.9 | 0.5 |
| Example 7 | 348 | 311 | 302 | 81.4 | 89.7 | 81.4 | 135 | 114 | 0.84 | 0.73 | 89 | 56.0 | 0.4 |
| Example 8 | 330 | 299 | 277 | 74.5 | 77.3 | 78.0 | 134 | 112 | 0.84 | 0.74 | 91 | 55.8 | 0.5 |
| Example 9 | 378 | 317 | 304 | 82.1 | 89.7 | 82.1 | 145 | 127 | 0.88 | 0.70 | 84 | 60.1 | 0.4 |
| Example 10 | 337 | 280 | 305 | 78.0 | 86.9 | 78.0 | 126 | 105 | 0.83 | 0.79 | 83 | 52.0 | 0.3 |
| Comparative Example 1 | 302 | 265 | 250 | 68.3 | 68.3 | 69.7 | 134 | 110 | 0.82 | 0.74 | 88 | 56.0 | 0.1 |

Resin: Flexural elastic modulus under room-temperature condition = 3.73 GPa
Flexural elastic modulus under hot-wet condition = 2.83 GPa
Water absoption = 1.84%

TABLE 2

| | | Modification degree | | | | Properties of fiber | | |
|---|---|---|---|---|---|---|---|---|
| | Section | Pmin | Pmax | D | S | pH | O/C | N/C |
| Example 11 | three leaves | 0.094 | 0.094 | 2.6 | 1.10 | 7.2 | 0.12 | 0.05 |
| Example 12 | Δ | 0.086 | 0.086 | 1.4 | 1.11 | 7.2 | 0.11 | 0.05 |
| Example 13 | ellipse | 0.044 | 0.143 | 1.8 | 1.08 | 7.2 | 0.12 | 0.05 |
| Example 14 | three leaves | 0.094 | 0.094 | 2.6 | 1.10 | 5.8 | 0.11 | 0.04 |
| Example 15 | three leaves | 0.094 | 0.094 | 2.6 | 1.10 | 5.6 | 0.16 | 0.01 |
| Comparative Example 2 | ○ | 0.080 | 0.080 | 1.0 | 1.09 | 5.6 | 0.15 | 0.01 |

| | Properties of composite material | | | | | | | | | | | |
|---|---|---|---|---|---|---|---|---|---|---|---|---|
| | OHC | | | | | | Flexural elastic modulus | | | Water | OHC | | Void |
| | RT MPa | H/W MPa | CAI MPa | CILS MPa | ILSS MPa | 90° TS MPa | RT MPa | H/W MPa | Ratio | absorption % | retention % | Vf % | content % |
| Example 11 | 362 | 310 | 317 | 76.6 | 84.2 | 80.7 | 134 | 120 | 0.90 | 1.09 | 86 | 55.9 | 0.5 |
| Example 12 | 335 | 289 | 317 | 71.1 | 75.9 | 76.6 | 137 | 122 | 0.89 | 1.09 | 86 | 56.0 | 0.5 |
| Example 13 | 333 | 284 | 313 | 69.7 | 75.2 | 75.9 | 135 | 123 | 0.91 | 1.09 | 85 | 56.0 | 0.5 |
| Example 14 | 344 | 300 | 297 | 73.8 | 80.7 | 75.2 | 135 | 119 | 0.88 | 1.09 | 87 | 55.8 | 0.4 |
| Example 15 | 344 | 296 | 288 | 68.3 | 71.8 | 75.9 | 135 | 119 | 0.88 | 1.09 | 86 | 56.0 | 0.3 |
| Comparative Example 2 | 317 | 270 | 261 | 62.1 | 66.9 | 69.0 | 135 | 118 | 0.87 | 1.09 | 85 | 56.0 | 0.1 |

Resin: Flexural elastic modulus under room-temperature condition = 3.92 GPa
Flexural elastic modulus under hot-wet condition = 2.71 GPa
Water absorption = 2.73%

TABLE 3

| | | Modification degree | | | | Properties of fiber | | |
|---|---|---|---|---|---|---|---|---|
| | Section | Pmin | Pmax | D | S | pH | O/C | N/C |
| Example 16 | three leaves | 0.094 | 0.094 | 2.6 | 1.10 | 7.2 | 0.12 | 0.05 |
| Example 17 | Δ | 0.086 | 0.086 | 1.4 | 1.11 | 7.2 | 0.11 | 0.05 |
| Example 18 | ellipse | 0.044 | 0.143 | 1.8 | 1.08 | 7.2 | 0.12 | 0.05 |

TABLE 3-continued

| | Section | Pmin | Pmax | D | S | pH | O/C | N/C |
|---|---|---|---|---|---|---|---|---|
| Example 19 | three leaves | 0.094 | 0.094 | 2.6 | 1.10 | 5.6 | 0.16 | 0.01 |
| Comparative Example 3 | ○ | 0.080 | 0.080 | 1.0 | 1.09 | 5.6 | 0.15 | 0.01 |

| | Properties of composite material | | | | | | | | | | | |
|---|---|---|---|---|---|---|---|---|---|---|---|---|
| | OHC | | | | | | Flexural elastic modulus | | | Water | OHC | | Void |
| | RT MPa | H/W MPa | CAI MPa | CILS MPa | ILSS MPa | 90° TS MPa | RT MPa | H/W MPa | Ratio | absorption % | retention % | Vf % | content % |
| Example 16 | 346 | 298 | 297 | 78.0 | 84.9 | 81.4 | 136 | 115 | 0.84 | 1.13 | 86 | 56.0 | 0.4 |
| Example 17 | 318 | 277 | 297 | 71.8 | 77.3 | 75.9 | 135 | 115 | 0.85 | 1.12 | 87 | 55.9 | 0.5 |
| Example 18 | 317 | 276 | 293 | 71.1 | 76.6 | 75.9 | 136 | 114 | 0.83 | 1.13 | 87 | 55.8 | 0.5 |
| Example 19 | 326 | 282 | 276 | 69.0 | 73.1 | 77.3 | 136 | 115 | 0.85 | 1.13 | 86 | 55.9 | 0.4 |
| Comparative Example 3 | 305 | 264 | 242 | 62.8 | 68.3 | 68.3 | 135 | 114 | 0.83 | 1.12 | 87 | 56.0 | 0.1 |

Resin: Flexural elastic modulus under room-temperature condition = 3.82 GPa
Flexural elastic modulus under hot-wet condition = 2.71 GPa
Water absorption = 2.95%

TABLE 4

| | | Modification degree | | | | Properties of fiber | | |
|---|---|---|---|---|---|---|---|---|
| | Section | Pmin | Pmax | D | S | pH | O/C | N/C |
| Comparative Example 4 | three leaves | 0.094 | 0.094 | 2.6 | 1.10 | 5.4 | 0.21 | 0.01 |

| | Properties of composite material | | | | | | | | | | | |
|---|---|---|---|---|---|---|---|---|---|---|---|---|
| | OHC | | | | | | Flexural elastic modulus | | | Water | OHC | | Void |
| | RT MPa | H/W MPa | CAI MPa | CILS MPa | ILSS MPa | 90° TS MPa | RT MPa | H/W MPa | Ratio | absorption % | retention % | Vf % | content % |
| Comparative Example 4 | 279 | 235 | 262 | 69.7 | 65.6 | 51.8 | 124 | 102 | 0.82 | 1.40 | 84 | 53.7 | 2.0 |

Resin: Flexural elastic modulus under room-temperature condition = 3.40 GPa
Flexural elastic modulus under hot-wet condition = 2.35 GPa
Water absorption = 3.50%

Industrial Applications of the Invention

Since carbon fiber-reinforced composite materials produced by using the prepegs according to the present invention are excellent in open-hole compression strength under hot-wet conditions and in compression strength after impact, they are suitable particularly as an aircraft primary structure material and can be applied to other uses such as general industrial uses and sporting goods uses.

We claim:

1. A prepreg comprising noncircular cross-section carbon fibers and a matrix resin having a flexural elastic modulus of 2.7 GPa or more and having a water absorption of 3.4% or less under a hot-wet condition after curing.

2. A prepreg comprising carbon fibers and a matrix resin, a quasi-isotropic material after curing of said prepreg having an open-hole compression strength under a hot-wet condition, and having a compression strength after impact under a room-temperature condition, said compression strength at each said condition being 275 MPa or more.

3. A prepreg comprising noncircular cross-section carbon fibers and a matrix resin having a flexural elastic modulus of 2.7 GPa or more, and having a water absorption of 3.4% or less under a hot-wet condition after curing, a quasi-isotropic material provided after curing of said prepreg having an open-hole compression strength under a hot-wet condition and a compression strength after impact under a room-temperature condition, said compression strength at each said condition being 275 MPa or more.

4. The prepreg according to claim 2, wherein a single filament forming said carbon fibers has a noncircular cross section.

5. The prepreg according to claim 1, wherein single filament forming said carbon fibers has a ratio of a minimum geometrical moment of inertia to the square of the cross-sectional area (Pmin) of 0.085 or more.

6. The prepreg according to claim 1, wherein a single filament forming said carbon fibers has a ratio of a minimum geometrical moment of inertia to the square of the sectional area (Pmin) of 0.019 or more, and has a ratio of a maximum geometrical moment of inertia to the square of said cross-sectional area (Pmax) of 0.13 or more.

7. The prepreg according to claim 1, wherein a cross section of a single filament forming said carbon fibers has at least one symmetry plane substantially passing through a centroid of said cross section, and wherein said cross section is noncircular and has a rotationally symmetric angle θ defined by θ=360°/n, wherein "n" is an integer from 1 to 10.

8. The prepreg according to claim 1, wherein a cross section of a single filament forming said carbon fibers is formed as a multileaf figure having a plurality of leaves extending in the radial direction, and wherein each said leaf has a bulge between a root and a tip thereof so that said multileaf figure is formed by substantially combining a plurality of circles.

9. The prepreg according to claim 1, wherein a cross section of a single filament forming said carbon fibers is formed as a noncircular figure having concavities formed in a direction toward a center of said cross section of said single filament.

10. The prepreg according to claim 1 in a cross section of a single filament forming said carbon fibers, a deformation degree "D", defined as a ratio R/r of a radius of a circumscribed circle "R" to a radius of an inscribed circle "r", is in the range of 1.5 to 7.0.

11. The prepreg according to claim 1, wherein an internal structure of said carbon fibers is a nonlamella structure having a substantially uniform crystal structure.

12. The prepreg according to claim 1, wherein the surface flatness "S" of said carbon fibers is 1.16 or less.

13. The prepreg according to claim 1, wherein the tensile strength of said carbon fibers, determined in a form of a resin impregnated strand, is 3 GPa or more, and wherein the tensile elastic modulus thereof is 200 GPa or more.

14. The prepreg according to claim 1, wherein the surface oxygen concentration O/C of said carbon fibers, as determined by X-ray photoelectric spectrometry, is not less than 0.02 and not more than 0.20, and wherein the surface nitrogen concentration N/C thereof is not less than 0.02 and not more than 0.3.

15. The prepreg according to claim 1, wherein pH of a surface of said carbon fibers is 6 or more.

16. The prepreg according to claim 1, wherein said matrix resin contains (A) a cyanic ester resin, or a mixture or a prereactant of a maleimide resin and a cyanic ester resin, (B) an epoxy resin and (C) a thermoplastic resin having a glass transition temperature of 180° C. or more,
and said epoxy resin (B) contains at least one of the following (B1), (B2) and (B3):
(B1) a glycidylamine type epoxy resin having three or more glycidyl groups in a single molecule,
(B2) an epoxy resin having a condensed aromatic ring in its skeleton and
(B3) a glycidylether type epoxy resin.

17. The prepreg according to claim 16, wherein said maleimide resin is methylene bis-p-phenylene dimaleimide and said cyanic ester resin is bisphenol A dicyanate.

18. The prepreg according to claim 17, wherein the weight ratio of said methylene bis-p-phenylene dimaleimide to said bisphenol A dicyanate is in the range of 30:70 to 0:100.

19. The prepreg according to claim 16, wherein said glycidylamine type epoxy resin having three or more glycidyl groups in a single molecule is tetraglycidyldiaminodiphenylmethane.

20. The prepreg according to claim 16, wherein the weight ratio of said constitutional element (A) to said constitutional element (B) is in the range of 70:30 to 90:10.

21. The prepreg according to claim 16, wherein the weight ratio of sum of said cyanic element (A) and said epoxy element (B) to said thermoplastic resin element (C) is in the range of 100:2 to 100:20.

22. The prepreg according to claim 1, wherein said matrix resin contains (B) an epoxy resin, (C) a thermoplastic resin having a glass transition temperature of 180° C. or more and (D) a diamine compound which has one through three phenyl groups in its skeleton and wherein two bond groups each coupled to an amino group are coupled to meta positions of at least one phenyl group of said phenyl groups,
and said epoxy resin (B) contains at least one of the following (B1), (B2) and (B3):
(B1) a glycidylamine type epoxy resin having three or more glycidyl groups in a single molecule,
(B2) an epoxy resin having a condensed aromatic ring in its skeleton and
(B3) a glycidylether type epoxy resin.

23. The prepreg according to claim 22, wherein said diamine compound (D) is 3,3'-diaminodiphenylsulfone.

24. The prepreg according to claim 22, wherein said epoxy resin (B) contains tetraglycidyldiaminodiphenylmethane at a content of 80 wt. % or more relative to the weight of said epoxy resin (B), and wherein said thermoplastic resin (C) is polyethersulfone.

25. The prepreg according to claim 22, wherein the mole percentage of said diamine compound (D) is in the range of 0.15 to 0.2 times the mole percentage of the epoxy content of said epoxy resin.

26. The prepreg according to claim 22, wherein the amount of said thermoplastic resin (C) is in the range of 1 to 15 wt. % relative to the weight of said epoxy resin.

27. The prepreg according to claim 22, wherein said epoxy resin (B) is a blend of tetraglycidyldiaminodiphenylmethane and an epoxy resin having two epoxy groups in a single molecule.

28. The prepreg according to claim 27, wherein said epoxy resin having two epoxy groups in a single molecule is bisphenol F epoxy resin.

29. The prepreg according to claim 1, wherein a film, particles or fibers of a thermoplastic resin are present locally at a position near the surface of said prepreg.

30. The prepreg according to claim 29, wherein said thermoplastic resin is a polyamide.

31. A carbon fiber-reinforced composite material produced by curing a prepreg according to any of claims 1, 2 and 3.

32. A carbon fiber-reinforced composite material reinforced by noncircular cross-section carbon fibers and having a ratio of a flexural elastic modulus under a hot-wet condition to a flexural elastic modulus under a temperature condition of 0.83 or more.

33. A fiber-reinforced composite material produced by curing a prepeg according to any of claims 1, 2 and 3 and having a ratio of a flexural elastic modulus under a hot-wet condition to a flexural elastic modulus under a room-temperature condition of 0.83 or more.

34. The carbon fiber-reinforced composite material according to claim 31 wherein the water absorption value thereof is 1.3% or less.

35. The carbon fiber-reinforced composite material according to claim 32, wherein the water absorption value thereof is 1.3% or less.

* * * * *

UNITED STATES PATENT AND TRADEMARK OFFICE
CERTIFICATE OF CORRECTION

PATENT NO. : 5,910,456
DATED : June 8, 1999
INVENTOR(S) : Matsuhisa et al

It is certified that error appears in the above-identified patent and that said Letters Patent is hereby corrected as shown below:

In Column 29, at approximately line 35, before the paragraph starting with "The data" please insert --(E) Determination of other FRP properties:-- on a line by itself.

In Column 44, line 49, please change "wherein" to --wherein a--.

In Column 45, line 10, please change "in" to --wherein--.

In Column 46, line 51, please change "temperature" to --room-temperature--.

Signed and Sealed this

Eighth Day of February, 2000

Attest:

Attesting Officer

Q. TODD DICKINSON

Commissioner of Patents and Trademarks